(12) United States Patent
Hedlund et al.

(10) Patent No.: US 12,286,175 B2
(45) Date of Patent: Apr. 29, 2025

(54) SNOWMOBILE

(71) Applicant: Polaris Industries Inc., Medina, MN (US)

(72) Inventors: Michael A. Hedlund, Roseau, MN (US); Michael L Fugleberg, Wyoming, MN (US); Matthew J. Prusak, Salol, MN (US); Jeffrey A Eaton, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/975,082

(22) Filed: Oct. 27, 2022

(65) Prior Publication Data

US 2023/0052282 A1 Feb. 16, 2023

Related U.S. Application Data

(60) Continuation of application No. 15/387,544, filed on Dec. 21, 2016, now Pat. No. 11,505,263, which is a continuation of application No. 14/812,998, filed on Jul. 29, 2015, now Pat. No. 9,540,072, which is a division of application No. 13/763,282, filed on Feb. 8, 2013, now Pat. No. 9,096,289.

(60) Provisional application No. 61/597,104, filed on Feb. 9, 2012.

(51) Int. Cl.
*B62M 27/02* (2006.01)
*B62D 55/104* (2006.01)

(52) U.S. Cl.
CPC .......... *B62D 55/104* (2013.01); *B62M 27/02* (2013.01); *B60Y 2200/252* (2013.01); *B60Y 2400/86* (2013.01); *B62M 2027/023* (2013.01); *B62M 2027/026* (2013.01); *B62M 2027/028* (2013.01)

(58) Field of Classification Search
CPC ................ B62D 55/104; B62M 27/02; B62M 2027/023; B62M 2027/026; B62M 2027/28; B60Y 2200/252; B60Y 2400/86
See application file for complete search history.

(56) References Cited

U.S. PATENT DOCUMENTS

| 2,834,608 A | 5/1958 | Wixson |
| RE26,775 E | 1/1970 | Smieja |
| 3,684,045 A | 8/1972 | Samuelson |

(Continued)

FOREIGN PATENT DOCUMENTS

| CA | 1150752 A | 7/1983 |
| CA | 2561337 | 9/1999 |

(Continued)

OTHER PUBLICATIONS

Annex to Form PCT/ISA/206 Communication Relating to the Results of the Partial International Search issued by the European Patent Office, mailed Mar. 2, 2010, Rijswijk, Netherlands, for a related international PCT Application No. PCT/US2009/066093; 3 pages.

(Continued)

*Primary Examiner* — Jacob D Knutson
(74) *Attorney, Agent, or Firm* — Faegre Drinker Biddle & Reath LLP

(57) ABSTRACT

A snowmobile includes a chassis comprising a bulkhead and a tunnel, a front suspension coupled to bulkhead, a rear suspension coupled to the tunnel, and slide rails coupled to the rear suspension.

19 Claims, 22 Drawing Sheets

(56) References Cited

U.S. PATENT DOCUMENTS

| | | | |
|---|---|---|---|
| 3,688,856 A | 9/1972 | Boehm et al. |
| 3,712,416 A | 1/1973 | Swanson et al. |
| 3,791,482 A | 2/1974 | Sykora |
| 3,800,910 A | 4/1974 | Rose |
| 3,840,082 A | 10/1974 | Olson |
| 3,901,335 A | 8/1975 | Johnson |
| 3,933,213 A | 1/1976 | Trowbridge |
| 3,966,014 A | 6/1976 | Gowing |
| 3,969,895 A | 7/1976 | Krizman |
| RE28,922 E | 8/1976 | Lloyd, III |
| 3,977,493 A | 8/1976 | Richardson |
| 4,109,751 A | 8/1978 | Kabele |
| 4,136,756 A | 1/1979 | Kawamura |
| 4,222,453 A | 9/1980 | Fixsen et al. |
| 4,254,746 A | 3/1981 | Chiba et al. |
| 4,339,156 A | 7/1982 | Livesay |
| 4,407,386 A | 10/1983 | Yasui et al. |
| 4,442,913 A | 4/1984 | Grinde |
| 4,592,316 A | 6/1986 | Shiratsuchi et al. |
| 4,782,912 A | 11/1988 | Wandless |
| 4,858,722 A | 8/1989 | Abbe et al. |
| 4,917,207 A | 4/1990 | Yasui et al. |
| 4,987,965 A | 1/1991 | Bourret |
| 5,016,728 A | 5/1991 | Zulawski |
| 5,060,745 A | 10/1991 | Yasui et al. |
| 5,152,365 A | 10/1992 | Aoshima |
| 5,232,066 A | 8/1993 | Schnelker |
| 5,233,831 A | 8/1993 | Hitomi et al. |
| 5,251,718 A | 10/1993 | Inagawa et al. |
| 5,370,198 A | 12/1994 | Karpik |
| 5,514,047 A | 5/1996 | Tibbles et al. |
| 5,660,245 A | 8/1997 | Marier et al. |
| 5,692,759 A | 12/1997 | Flynn |
| 5,697,332 A | 12/1997 | Asai et al. |
| 5,708,238 A | 1/1998 | Asao et al. |
| 5,727,643 A | 3/1998 | Kawano et al. |
| 5,832,881 A | 11/1998 | Karay et al. |
| 5,860,486 A | 1/1999 | Boivin et al. |
| 5,947,217 A | 9/1999 | Snare et al. |
| 6,109,217 A | 8/2000 | Hedlund et al. |
| 6,155,374 A | 12/2000 | Uchida |
| 6,161,908 A | 12/2000 | Takayama et al. |
| 6,216,809 B1 | 4/2001 | Etou et al. |
| 6,227,323 B1* | 5/2001 | Ashida ................ B62M 27/02 123/65 PE |
| 6,247,442 B1 | 6/2001 | Bedard et al. |
| 6,321,864 B1 | 11/2001 | Forbes |
| 6,343,578 B1 | 2/2002 | Kerkau et al. |
| 6,378,645 B1 | 4/2002 | Uegane et al. |
| 6,379,411 B1 | 4/2002 | Turner et al. |
| 6,390,219 B1 | 5/2002 | Vaisanen |
| 6,454,037 B1* | 9/2002 | Atsuumi ............... B62M 27/02 180/186 |
| 6,461,208 B2 | 10/2002 | Suzuki et al. |
| 6,464,033 B2 | 10/2002 | Izumi et al. |
| 6,520,284 B2 | 2/2003 | Spannbauer et al. |
| 6,551,385 B2 | 4/2003 | Turner et al. |
| 6,554,665 B1 | 4/2003 | Kaneko |
| RE38,124 E | 5/2003 | Mallette et al. |
| 6,557,530 B1 | 5/2003 | Benson et al. |
| 6,568,030 B1 | 5/2003 | Watanabe et al. |
| 6,595,309 B1 | 7/2003 | Savage et al. |
| 6,626,258 B1 | 9/2003 | Forbes |
| 6,681,724 B1 | 1/2004 | Berg |
| 6,695,083 B2* | 2/2004 | Nakamura ............ F16H 57/04 180/68.1 |
| 6,715,460 B2 | 4/2004 | Ashida et al. |
| 6,725,958 B2 | 4/2004 | Ashida et al. |
| 6,745,862 B2 | 6/2004 | Morii et al. |
| 6,755,271 B1 | 6/2004 | Berg |
| 6,758,187 B2 | 7/2004 | Waters |
| 6,796,395 B1 | 9/2004 | Berg et al. |
| 6,811,504 B2 | 11/2004 | Korenjak et al. |
| 6,823,834 B2 | 11/2004 | Benson et al. |
| 6,896,087 B2 | 5/2005 | Korenjak et al. |
| 6,926,108 B1 | 8/2005 | Polakowski et al. |
| 6,941,924 B2 | 9/2005 | Morii et al. |
| 6,942,050 B1 | 9/2005 | Honkala et al. |
| 7,004,137 B2 | 2/2006 | Kunugi et al. |
| 7,040,437 B1 | 5/2006 | Fredrickson et al. |
| 7,047,924 B1 | 5/2006 | Waters et al. |
| 7,059,440 B1 | 6/2006 | Berg et al. |
| 7,063,057 B1 | 6/2006 | Waters et al. |
| 7,063,063 B2 | 6/2006 | Morii et al. |
| 7,063,639 B2 | 6/2006 | Schoenfelder et al. |
| 7,140,463 B2 | 11/2006 | Morii et al. |
| 7,159,557 B2 | 1/2007 | Yasuda et al. |
| 7,182,165 B1 | 2/2007 | Keinath et al. |
| 7,213,638 B2 | 5/2007 | Seiler et al. |
| 7,237,802 B2 | 7/2007 | Rose et al. |
| 7,237,803 B2 | 7/2007 | Nguyen |
| 7,249,652 B2 | 7/2007 | Wolf |
| 7,275,512 B2 | 10/2007 | Deiss et al. |
| 7,357,207 B2 | 4/2008 | Vaeisaenen |
| RE40,289 E | 5/2008 | Atsuumi et al. |
| 7,401,674 B1 | 7/2008 | Berg et al. |
| 7,444,236 B2 | 10/2008 | Wiles |
| 7,455,141 B2 | 11/2008 | Hildebrand |
| 7,458,354 B1 | 12/2008 | Phaneuf et al. |
| 7,578,366 B2* | 8/2009 | Moji .................... B62M 27/02 180/186 |
| 7,708,097 B1 | 5/2010 | Tharaldson et al. |
| 7,753,154 B2 | 7/2010 | Maltais |
| 7,761,217 B2 | 7/2010 | Waters et al. |
| 7,802,646 B2 | 9/2010 | Matsudo |
| 7,854,290 B1 | 12/2010 | McKoskey |
| 8,127,877 B2 | 3/2012 | Fredrickson et al. |
| 8,602,159 B2 | 12/2013 | Harris et al. |
| 8,613,335 B2 | 12/2013 | Deckard et al. |
| 8,651,800 B2 | 2/2014 | Li |
| 8,746,719 B2 | 6/2014 | Safranski et al. |
| 8,893,835 B2 | 11/2014 | Nam et al. |
| 9,096,289 B2 | 8/2015 | Hedlund et al. |
| 9,174,702 B1 | 11/2015 | Gauthier et al. |
| 9,506,407 B2 | 11/2016 | Blake |
| 9,540,072 B2 | 1/2017 | Hedlund et al. |
| 9,845,004 B2 | 12/2017 | Hedlund et al. |
| 10,358,187 B2 | 7/2019 | Vistad et al. |
| 2002/0017765 A1 | 2/2002 | Mallette et al. |
| 2002/0023792 A1 | 2/2002 | Bouffard et al. |
| 2002/0068490 A1 | 6/2002 | Ochiai |
| 2002/0179356 A1 | 12/2002 | Morii et al. |
| 2003/0172907 A1 | 9/2003 | Nytomt et al. |
| 2004/0069474 A1 | 4/2004 | Wu et al. |
| 2004/0089492 A1 | 5/2004 | Eide |
| 2004/0187826 A1 | 9/2004 | Kino et al. |
| 2004/0262064 A1 | 12/2004 | Lefort |
| 2005/0067220 A1 | 3/2005 | Keller et al. |
| 2005/0161283 A1 | 7/2005 | Emler |
| 2005/0199432 A1 | 9/2005 | Abe et al. |
| 2005/0199433 A1 | 9/2005 | Abe et al. |
| 2005/0205320 A1 | 9/2005 | Girouard et al. |
| 2005/0225067 A1 | 10/2005 | Nguyen |
| 2005/0252592 A1 | 11/2005 | Albright et al. |
| 2005/0252705 A1* | 11/2005 | Abe .................... B62M 27/02 180/190 |
| 2005/0279552 A1 | 12/2005 | Schuehmacher et al. |
| 2006/0032700 A1 | 2/2006 | Vizanko |
| 2006/0058143 A1 | 3/2006 | Rickling et al. |
| 2006/0085966 A1 | 4/2006 | Kerner et al. |
| 2006/0180370 A1 | 8/2006 | Polakowski et al. |
| 2006/0236980 A1 | 10/2006 | Maruo et al. |
| 2007/0017480 A1 | 1/2007 | Kondo |
| 2007/0028877 A1 | 2/2007 | McDonald et al. |
| 2007/0119650 A1 | 5/2007 | Eide |
| 2007/0199753 A1 | 8/2007 | Giese et al. |
| 2007/0221424 A1 | 9/2007 | Giese |
| 2007/0227810 A1 | 10/2007 | Sakurai et al. |
| 2007/0246283 A1 | 10/2007 | Giese et al. |
| 2007/0261904 A1 | 11/2007 | Fecteau et al. |
| 2008/0023262 A1 | 1/2008 | Hayashi et al. |
| 2008/0141957 A1 | 6/2008 | Dea et al. |
| 2009/0038869 A1 | 2/2009 | Beyer |
| 2009/0217908 A1 | 9/2009 | Watanabe et al. |

(56) References Cited

U.S. PATENT DOCUMENTS

| | | | |
|---|---|---|---|
| 2009/0294197 A1 | 12/2009 | Polakowski et al. | |
| 2010/0071981 A1 | 3/2010 | Nakamura et al. | |
| 2010/0071982 A1 | 3/2010 | Giese et al. | |
| 2010/0089355 A1 | 4/2010 | Fredrickson et al. | |
| 2010/0108427 A1* | 5/2010 | Richer | B62M 27/02 180/190 |
| 2010/0170231 A1 | 7/2010 | Yamaguchi | |
| 2010/0269771 A1 | 10/2010 | Wermuth et al. | |
| 2011/0073403 A1 | 3/2011 | Bennett et al. | |
| 2011/0088968 A1 | 4/2011 | Kempf et al. | |
| 2011/0100340 A1 | 5/2011 | Mukkala et al. | |
| 2011/0109153 A1 | 5/2011 | Berg | |
| 2011/0132679 A1 | 6/2011 | Kerner et al. | |
| 2011/0139528 A1 | 6/2011 | Eaton et al. | |
| 2011/0139529 A1 | 6/2011 | Eichenberger et al. | |
| 2011/0186371 A1 | 8/2011 | Berg et al. | |
| 2011/0192667 A1 | 8/2011 | Conn et al. | |
| 2011/0226538 A1 | 9/2011 | Brady et al. | |
| 2012/0143465 A1 | 6/2012 | Kim | |
| 2012/0205902 A1 | 8/2012 | Beavis et al. | |
| 2013/0032417 A1 | 2/2013 | Sampson | |
| 2013/0032418 A1 | 2/2013 | Ripley et al. | |
| 2013/0032419 A1 | 2/2013 | Conn et al. | |
| 2013/0032420 A1 | 2/2013 | Mills et al. | |
| 2013/0125535 A1 | 5/2013 | Schultz | |
| 2013/0180798 A1 | 7/2013 | Matsushima et al. | |
| 2013/0193676 A1 | 8/2013 | Mertens et al. | |
| 2013/0213349 A1 | 8/2013 | Sellnau et al. | |
| 2013/0233265 A1 | 9/2013 | Zurface et al. | |
| 2015/0197313 A1 | 7/2015 | Vistad et al. | |
| 2017/0101142 A1 | 4/2017 | Hedlund et al. | |
| 2019/0344859 A1 | 11/2019 | Vistad et al. | |

FOREIGN PATENT DOCUMENTS

| | | | |
|---|---|---|---|
| CA | 2863952 A1 | 8/2013 | |
| CA | 2935034 A1 | 7/2015 | |
| CA | 2935113 A1 | 7/2015 | |
| EP | 0287038 A2 | 10/1988 | |
| EP | 1283157 A2 * | 2/2003 | B62M 27/02 |
| EP | 1712772 A2 | 10/2006 | |
| EP | 2812236 A2 | 12/2014 | |
| EP | 2886436 A1 | 6/2015 | |
| EP | 3092169 A2 | 11/2016 | |
| EP | 3092391 A1 | 11/2016 | |
| EP | 3306058 A2 | 4/2018 | |
| FR | 2307974 A1 | 11/1976 | |
| JP | 01-113527 A | 5/1989 | |
| JP | 2001-065344 A | 3/2001 | |
| JP | 2003-343373 A | 12/2003 | |
| WO | 95/01503 A1 | 1/1995 | |
| WO | 01/05613 A1 | 1/2001 | |
| WO | 02/87957 A1 | 11/2002 | |
| WO | 2004/031567 A1 | 4/2004 | |
| WO | 2007/100751 A2 | 9/2007 | |
| WO | WO-2009114414 A1 * | 9/2009 | B60K 28/00 |
| WO | 2011/093847 A1 | 8/2011 | |
| WO | 2011/099959 A1 | 8/2011 | |
| WO | 2013/119958 A2 | 8/2013 | |
| WO | 2015/105974 A2 | 7/2015 | |
| WO | 2015/105976 A1 | 7/2015 | |

OTHER PUBLICATIONS

Article 34 Amendment filed, dated Nov. 15, 2010, for International Patent Application No. PCT/US2009/066110; 9 pages.
Communication Pursuant to Article 94(3) EPC issued by the European Patent Office, dated Apr. 6, 2017, for European Patent Application No. 14194801.8; 5 pages.
Communication Pursuant to Article 94(3) EPC issued by the European Patent Office, dated Feb. 6, 2018, for European Patent Application No. 15700942.4; 4 pages.
Communication Pursuant to Article 94(3) EPC issued by the European Patent Office, dated Nov. 14, 2018, for European Patent Application No. 15700942.4; 4 pages.
Examination Report issued by the Canadian Intellectual Property Office, dated Feb. 8, 2019, for Canadian Patent Application No. 2,863,952; 4 pages.
International Preliminary Report on Patentability issued by the International Searching Authority, dated Jul. 19, 2011, for International Patent Application No. PCT/US2009/066093; 9 pages.
International Preliminary Report on Patentability, issued by the European Patent Office, dated Jul. 12, 2016, for International Patent Application No. PCT/US2015/010621; 12 pages.
International Preliminary Report on Patentability, issued by the European Patent Office, dated Jun. 10, 2008, for International Patent Application No. PCT/US2007/004895; 22 pages.
International Preliminary Report on Patentability, issued by the European Patent Office, dated Jun. 17, 2016, for International Patent Application No. PCT/US2015/010623; 20 pages.
International Preliminary Report on Patentability, issued by the European Patent Office, dated Jun. 4, 2014, for International Patent Application No. PCT/US2013/025354; 10 pages.
International Preliminary Report on Patentability, issued by the European Patent Office, dated Mar. 30, 2011, for International Patent Application No. PCT/US2009/066110; 12 pages.
International Search Report and Written Opinion issued by the European Patent Office, dated Aug. 12, 2015, for International Patent Application No. PCT/US2015/010621; 17 pages.
International Search Report and Written Opinion issued by the European Patent Office, dated Mar. 24, 2015, for International Patent Application No. PCT/US2015/010623; 11 pages.
International Search Report and Written Opinion, issued by the European Patent Office, dated Jul. 2, 2010, for International Patent Application No. PCT/US2009/066093; 14 pages.
International Search Report and Written Opinion, issued by the European Patent Office, dated Nov. 6, 2007, for International Patent Application No. PCT/US2007/004895; 20 pages.
International Search Report and Written Opinion, issued by the European Patent Office, dated Sep. 18, 2013, for International Patent Application No. PCT/US2013/025354; 13 pages.
International Search Report, issued by the European Patent Office, dated Mar. 18, 2010, for International Patent Application No. PCT/US2009/066110; 5 pages.
Office Action issued by the Canadian Intellectual Property Office, dated May 12, 2020, for Canadian Patent Application No. 2,935,113; 4 pages.
Office Action issued by the Canadian Intellectual Property Office, dated May 31, 2021, for Canadian Patent Application No. 3,079,718; 4 pages.
Supplemental Written Opinion, issued by the European Patent Office, mailed Feb. 5, 2016, for International Patent Application No. PCT/US2015/010623; 8 pages.

* cited by examiner

SNOWMOBILE

CROSS-REFERENCE TO RELATED APPLICATIONS

The present application is a continuation of U.S. patent application Ser. No. 15/387,544, filed on Dec. 21, 2016, and entitled "SNOWMOBILE", which is a continuation of U.S. patent application Ser. No. 14/812,998, filed on Jul. 29, 2015, and entitled "SNOWMOBILE", which is a divisional of U.S. patent application Ser. No. 13/763,282, filed on Feb. 8, 2013, and entitled "SNOWMOBILE", which claims priority to U.S. Provisional Patent Application Ser. No. 61/597,104, filed on Feb. 9, 2012, the complete disclosures of which are expressly incorporated by reference herein.

BACKGROUND OF THE PRESENT DISCLOSURE

The present application relates to a snowmobile.

The present invention relates to snowmobiles, and more particularly, the present invention relates generally to a frame assembly and suspension assembly for snowmobiles. The present application claims priority to U.S. Provisional Patent Application Ser. No. 61/597,104, filed on Feb. 9, 2012, the subject matter of which is expressly incorporated by reference herein.

Performance characteristics of snowmobiles, including the comfort of the ride, depend on a variety of systems and components, including the snowmobile suspension. Typically, a snowmobile suspension includes two systems, a front suspension system for a pair of skis and a rear suspension system for the track.

The rear suspension of a snowmobile supports an endless track driven by the snowmobile engine to propel the machine. The track is supported beneath a vehicle chassis by a suspension that is designed to provide a comfortable ride and to help absorb the shock of the snowmobile crossing uneven terrain. Most modern snowmobiles use a slide rail suspension which incorporates a pair of slide rails along with several idler wheels to support the track in its configuration. The slide rails are typically suspended beneath the chassis by a pair of suspension arms, with each arm being attached at its upper end to the chassis of the snowmobile, and at its lower end to the slide rails. The mechanical linkage of the slide rails to the suspension arms and to the snowmobile chassis typically is provided by springs and at least one element acting along a linear path, such as a shock absorber, damper, air shock, shock and spring combination, or other linear force element (LFE). The springs are loaded to bias the slide rails downwardly away from the snowmobile chassis and the shock absorbers; dampers or LFEs provide damping forces for ride comfort.

SUMMARY OF THE PRESENT DISCLOSURE

In one aspect, a snowmobile comprises a chassis having a front chassis portion and a rear chassis portion. The front chassis portion includes a bulkhead and a steering mount positioned above the bulkhead by way of frame members. An engine has at least one intake and at least one exhaust port, and the engine is mounted with the at least one exhaust port facing forwardly. A steering post is coupled to the steering mount and extends substantially along a longitudinal centerline of the vehicle and over a top of the engine. An exhaust outlet is coupled to the at least one exhaust port, the exhaust outlet projecting vertically upwardly to a position higher than the engine, and projecting rearwardly between the steering post and one of the frame members.

In another aspect, a snowmobile comprises a chassis having a front chassis portion and a rear chassis portion, the front chassis portion includes a bulkhead. An engine is supported by the chassis. A steering post extends substantially along a longitudinal centerline of the vehicle and extends over a top of the engine and is coupled to the bulkhead. The snowmobile includes front steerable skis; spindles coupled to the skis; steering arms coupled to the spindles; and a first coupling link interconnecting the steering arms and the steering post, the first coupling link being an extruded member forming plural pivot points.

In another aspect, a snowmobile comprises a chassis extending along a longitudinal axis; and an engine supported by the bulkhead. The engine has a crankshaft having a crankshaft axis transverse to the longitudinal axis. The engine has a piston coupled to the crankshaft and reciprocates along a piston reciprocation axis, the piston reciprocation axis extending upwardly and forwardly. A continuously variable clutch has a drive clutch coupled coaxially to the crankshaft and a driven clutch mounted rearwardly of the drive clutch, wherein a line between a rotational axis of the drive clutch and a rotational axis of the driven clutch define a clutch axis, and wherein an angle formed between the piston reciprocation axis and the clutch axis is approximately 90°.

In yet another aspect, a snowmobile comprises a chassis including a bulkhead and a tunnel, an engine supported by the chassis, a front suspension coupled to the bulkhead, a rear suspension coupled to the tunnel, a fuel tank supported by a tunnel top surface, and a frame comprising frame tubes extending downwardly and rearwardly and coupled to rear corners of the tunnel, with the frame tubes flanking the fuel tank.

In a further embodiment, a snowmobile comprises a chassis having a bulkhead and a tunnel. An engine is supported by the chassis and a front suspension is coupled to bulkhead. A rear suspension is coupled to the tunnel and slide rails are coupled to the rear suspension. The rear suspension comprises a toggle link pivotally coupled to the tunnel, and a rear control arm coupled between the slide rails and the toggle link. A front control arm is coupled between the slide rails and the tunnel; wherein the snowmobile has a snowmobile center of gravity, and the front control arm is mounted at a position in a range of 300-310 mm relative to the snowmobile center of gravity.

In yet another embodiment, a snowmobile, comprises a chassis, having a bulkhead and a tunnel. An engine is supported by the chassis, and a front suspension is coupled to bulkhead. A rear suspension is coupled to the tunnel. Slide rails are coupled to the rear suspension, where the rear suspension is comprised of a toggle link pivotally coupled to the tunnel, and a rear control arm coupled between the slide rails and the toggle link; a carrier roller coupled to the toggle link, the toggle link being movable to a plurality of positions relative to the toggle link to vary the dynamics of the vehicle propulsion; and a front control arm coupled between the slide rails and the tunnel.

DETAILED DESCRIPTION OF THE DRAWINGS

Figure 1:
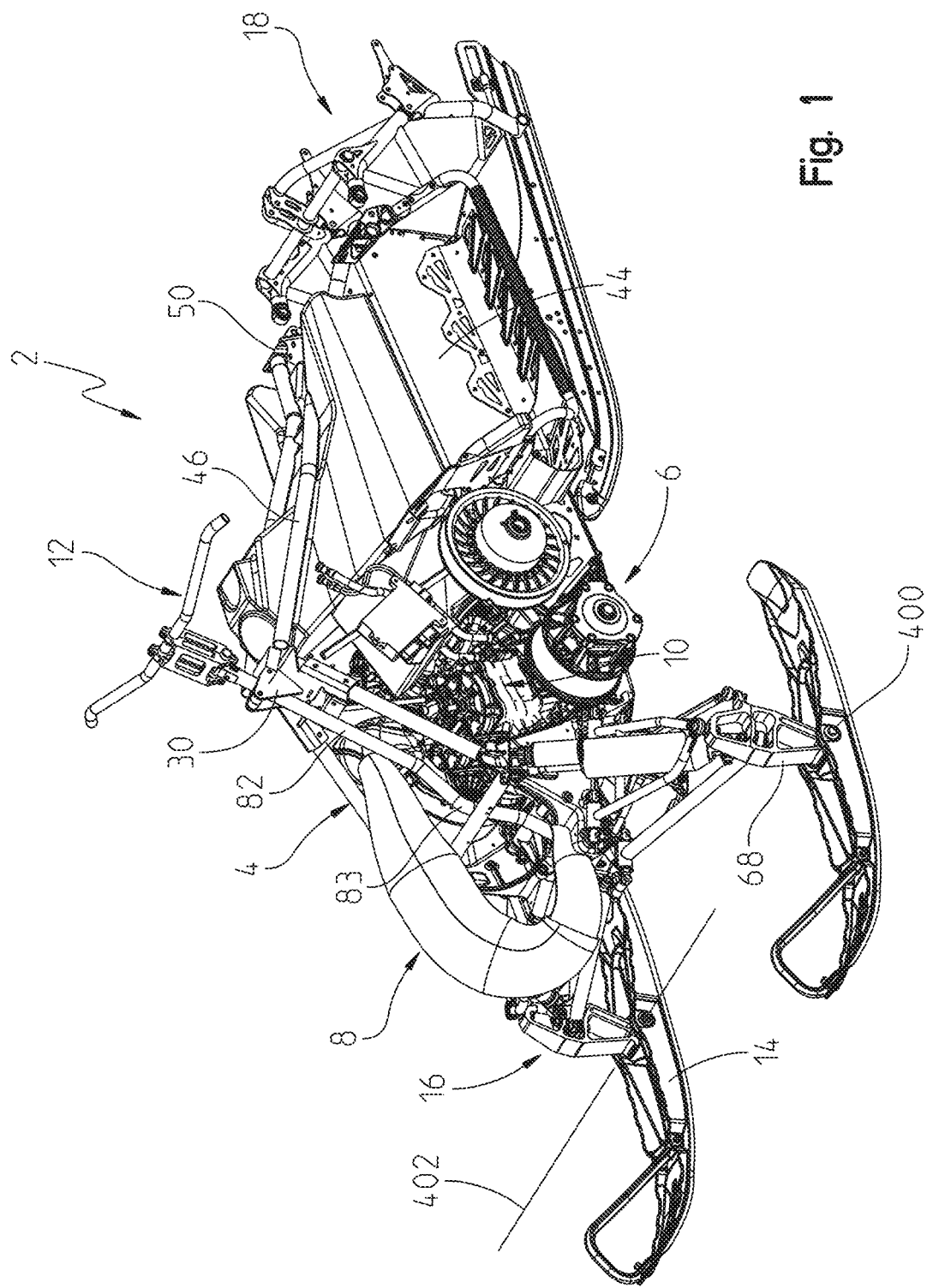
FIG. 1 shows a front perspective view of a snowmobile according to the present embodiment, shown without the body member and driver's seat.

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

With reference first to FIG. 1, a snowmobile is generally shown at 2 to include a frame 4, a propulsion system 6 coupled to the frame, an exhaust system 8 coupled to an engine 10 of the propulsion system 6, a steering system 12 coupled to steerable skis 14, and front 16 and rear 18 suspensions.

Figure 2:
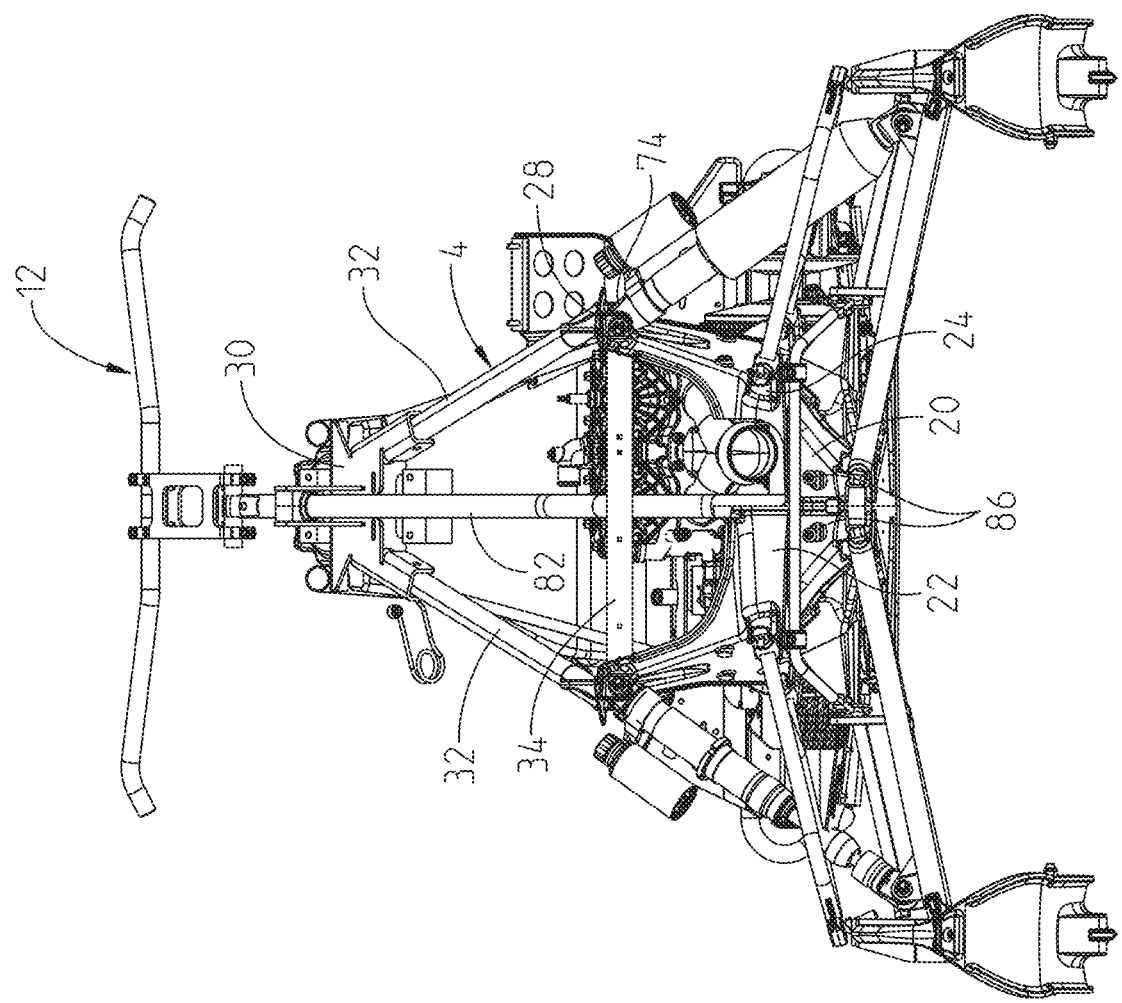
FIG. 2 is a front view of the snowmobile of FIG. 1 with the exhaust system removed.

With respect to FIG. 2, frame 4 will be described in greater detail. It should be understood that frame 4 is similar in nature to that described in Applicant's patent application Ser. No. 13/027,116, the subject matter of which is incorporated herein in its entirety. Frame 4 includes lower cast members 20, 22 which are fastened together in a clam shell type arrangement. Cast members 20 and 22 include integrated upper and lower pivot members 24, 26 (FIG. 3) and upper pedestals 28. A coupler 30 is provided which couples frame tubes 32 between coupler 30 and pedestal 28 of cast member 20. Cross tube 34 extends between the cast members 20 and 22. Frame tubes 32 could be fastened by any mechanical means such as by fasteners, welding, adhesives and the like.

Figure 3:
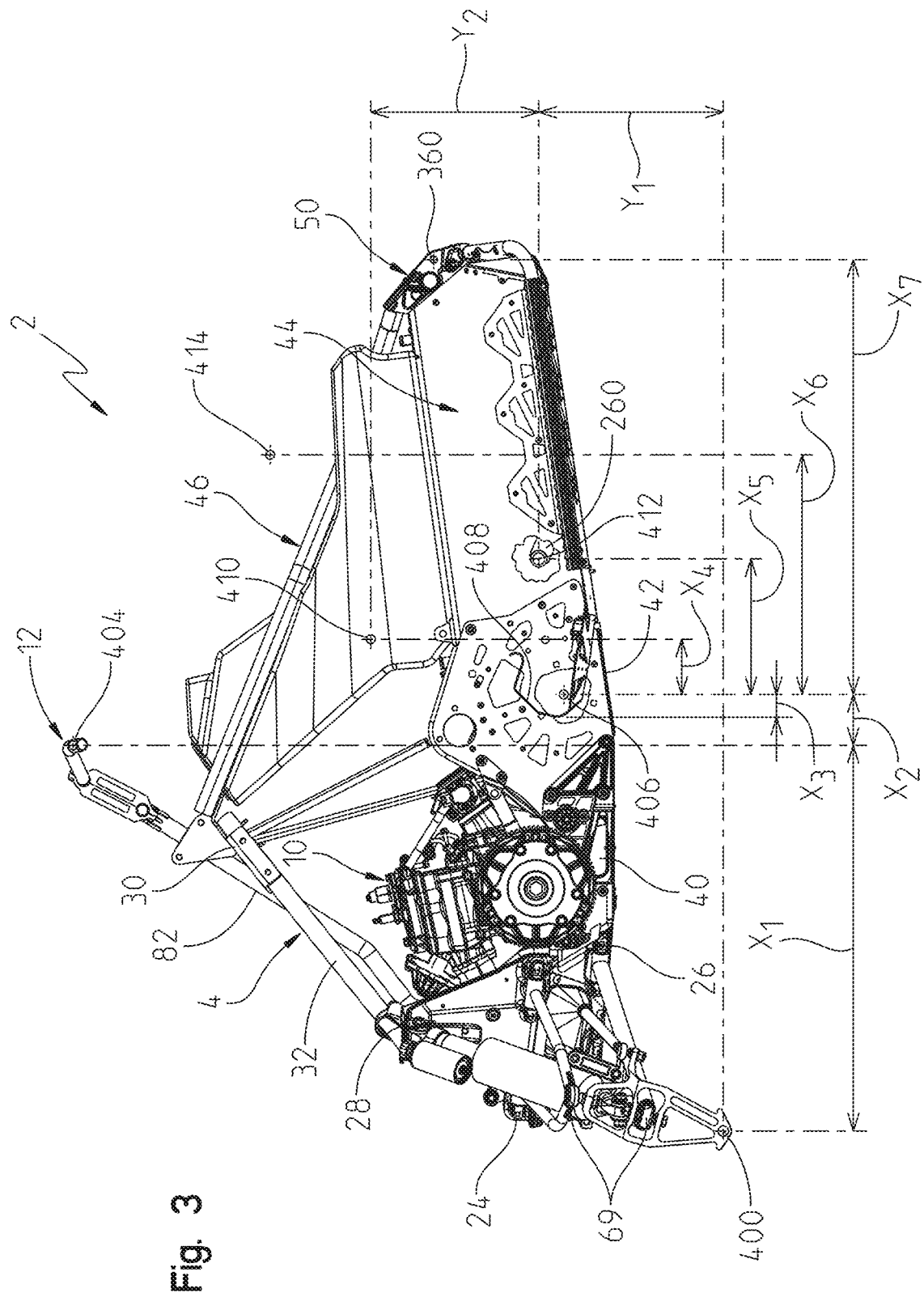
FIG. 3 is a side view of the snowmobile of FIG. 1.

With respect now to FIG. 3, frame 4 further includes engine cradle 40, drive housing 42, tunnel 44 and brace tubes 46 extending between coupler 30 and cast couplings 50 (FIG. 1) attached to tunnel 44.

Figure 4:
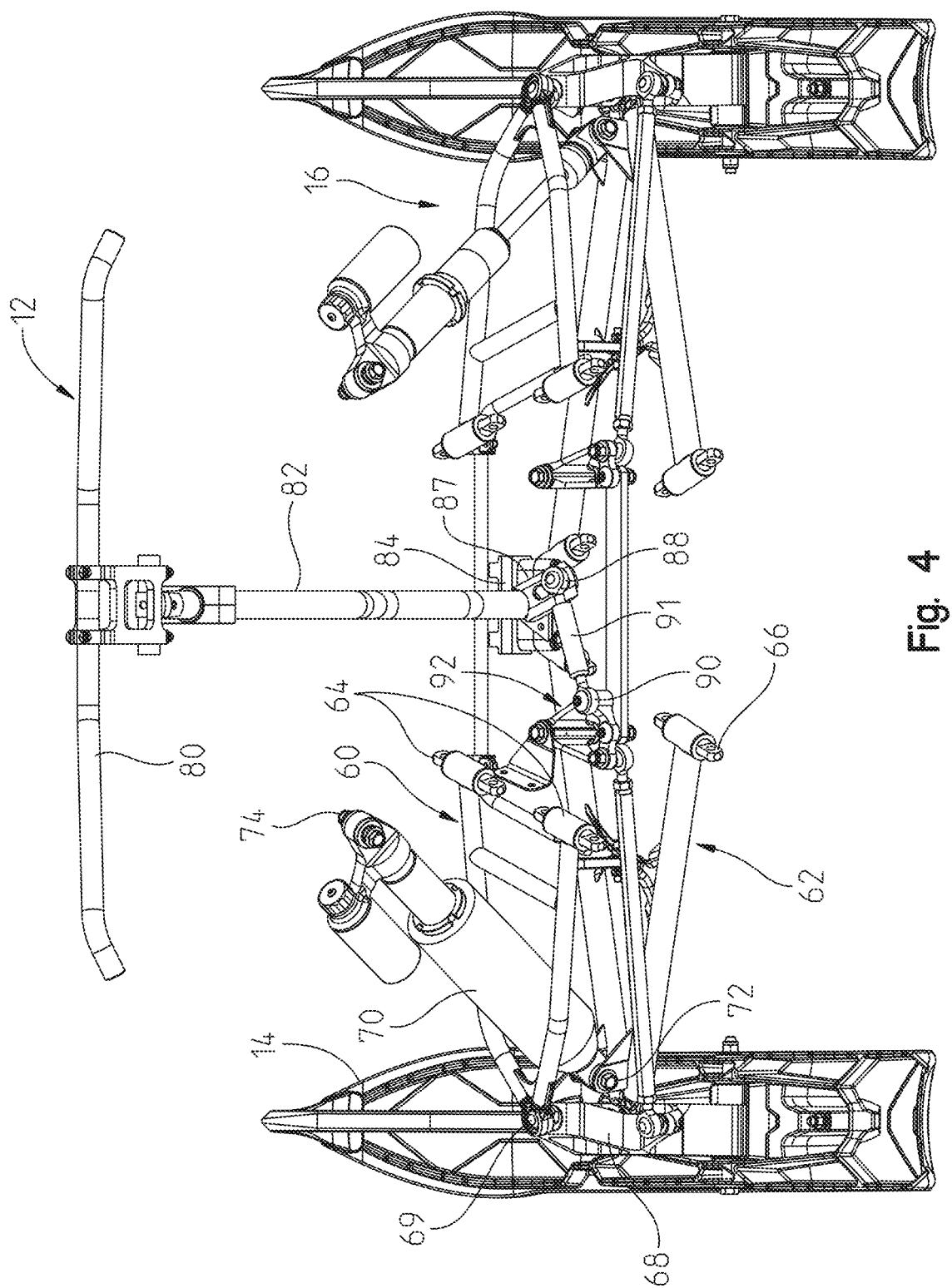
FIG. 4 is a rear perspective view of the steering system of the present embodiment.

With reference now to FIG. 4, suspension system 16 will be described in greater detail. Suspension 16 includes upper 60 and lower 62 alignment arms having pivot mounts 64 and 66 attachable to pivot members 24 (FIG. 2) and 26 (FIG. 3) where each of the alignment arms 60, 62 are attached to spindle 68 by way of ball joints 69 (FIGS. 3 and 4) as is known in the art. A shock absorber 70 is attached at 72 to lower alignment arm 62 and extends upwardly through upper alignment arm 60 and is attached at 74 to pedestal 28 (FIGS. 2 and 4).

Figure 5:
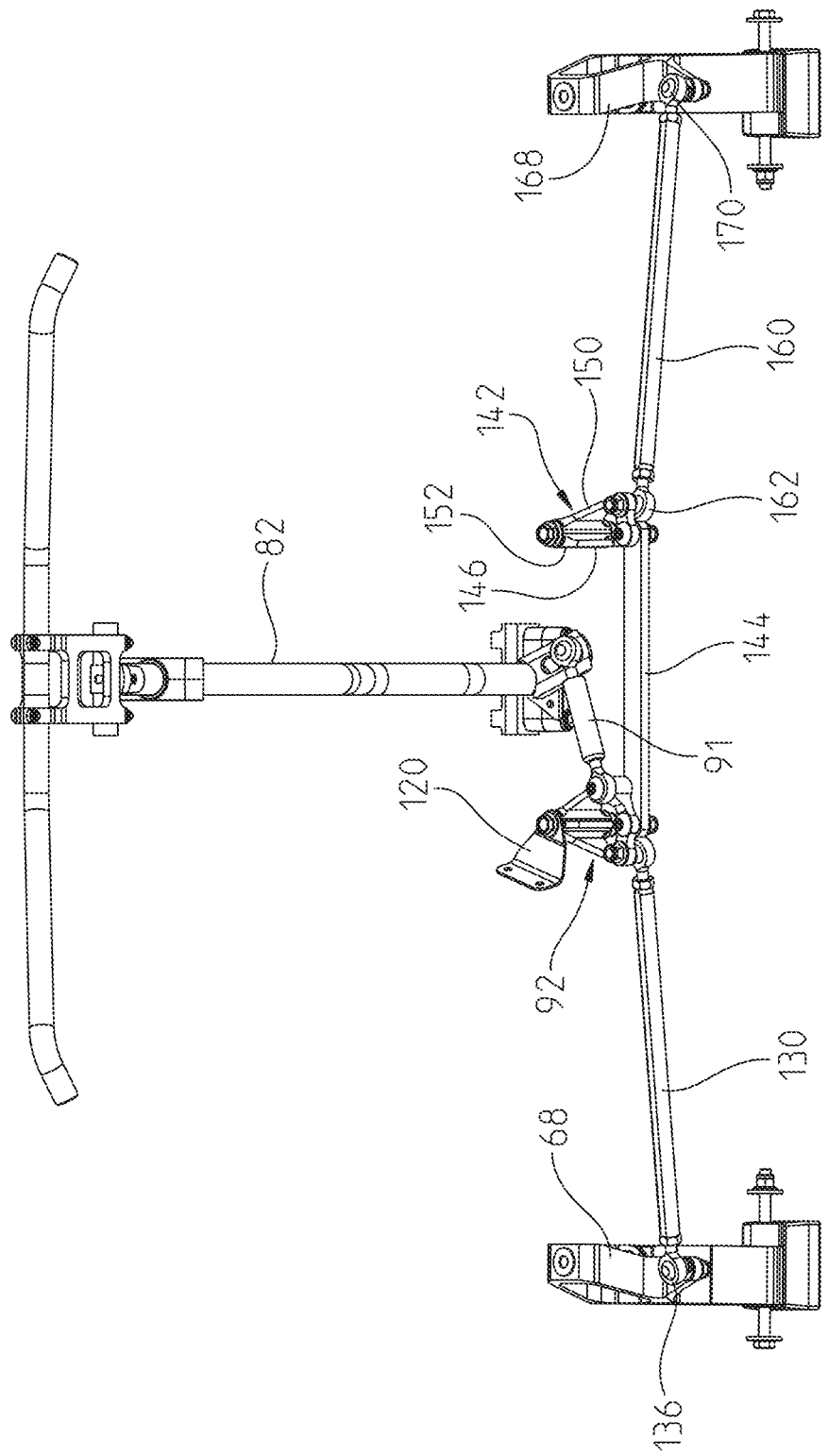
FIG. 5 is a view similar to that of FIG. 4 showing the suspension system removed.
Figure 6:
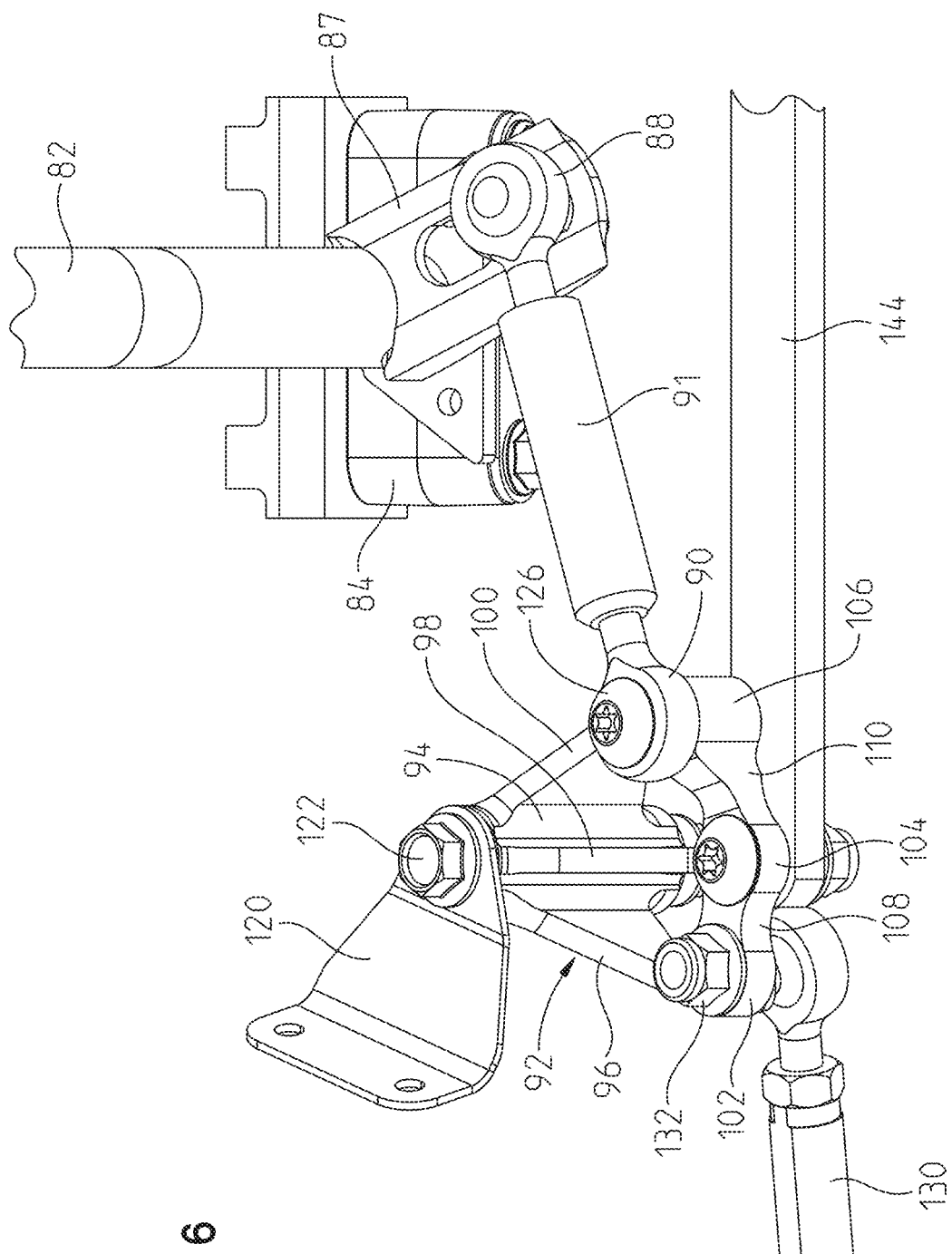
FIG. 6 is an enlarged view of the steering coupler.

With reference now to FIGS. 4-6, steering system 12 will be described in greater detail. As shown, steering system 12 includes handlebars 80 attached to a steering post 82 which is rotatably fixed at a lower end thereof and rotates relative to a mounting block 84. As shown, steering post 82 defines single post, center pivot steering, which extends over the engine 10 as shown best in FIG. 3. As shown in FIG. 1, steering post 82 includes an outward bend at 83 for clearance of engine 10. Mounting block 84 is attached to a front inner surface of the cast members 20, 22 by way of fasteners at 86 (FIGS. 2 and 4). Steering post 82 includes a pitman arm 87 having a ball joint 88 attached thereto. Ball joint 88 is coupled to a ball joint 90 by way of a link 91. Ball joint 90 is attached to a coupling link 92 having four pivot points.

As best shown in FIG. 6, coupling link 92 is a top extruded member having a pivot cylinder 94 with three radially extending webs or walls 96, 98 and 100 extending integrally from cylinder 94, and terminating in respective pivot bosses 102, 104 and 106. Bosses 102 and 104 are integrally connected by way of an integral link 108 whereas bosses 104 and 106 are interconnected by an integrated link 110.

With respect to FIGS. 5 and 6, coupling link 92 may be easily attached to the inside of cast member 20 by way of bracket 120 and pivotably mounted relative thereto by way of fastener 122. As also shown, ball joint 90 is attached to first boss 106 by way of fastener 126. Meanwhile, coupling link 92 is interconnected to tie rod 130 at boss 102 by way of fastener 132. Furthermore, tie rod 130 is attached to spindle by way of ball joint 136 (FIG. 5). As shown best in FIG. 5, coupling link 92 is interconnected in parallel to a second coupling link 142 by way of a drag link 144. Coupling link 142 is similar to coupling link 92, however, only includes two radial walls 146 and 150 attached to a pivot cylinder 152. In a similar manner, coupling link 142 is attached to tie rod 160 by ball joint 162, which in turn is coupled to spindle 168 by way of ball joint 170.

Figure 7:
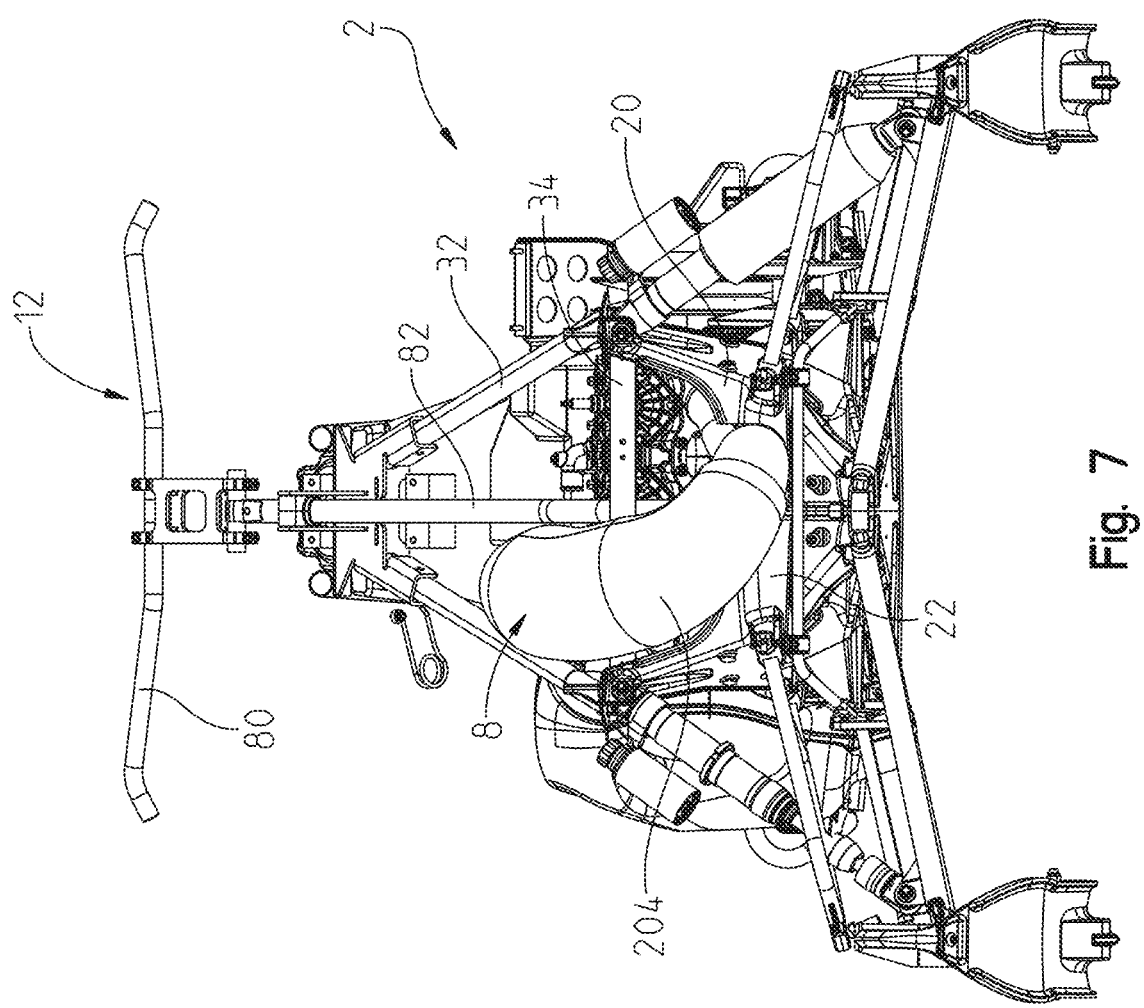
FIG. 7 is a view similar to that of FIG. 2, including the exhaust system.
Figure 8:
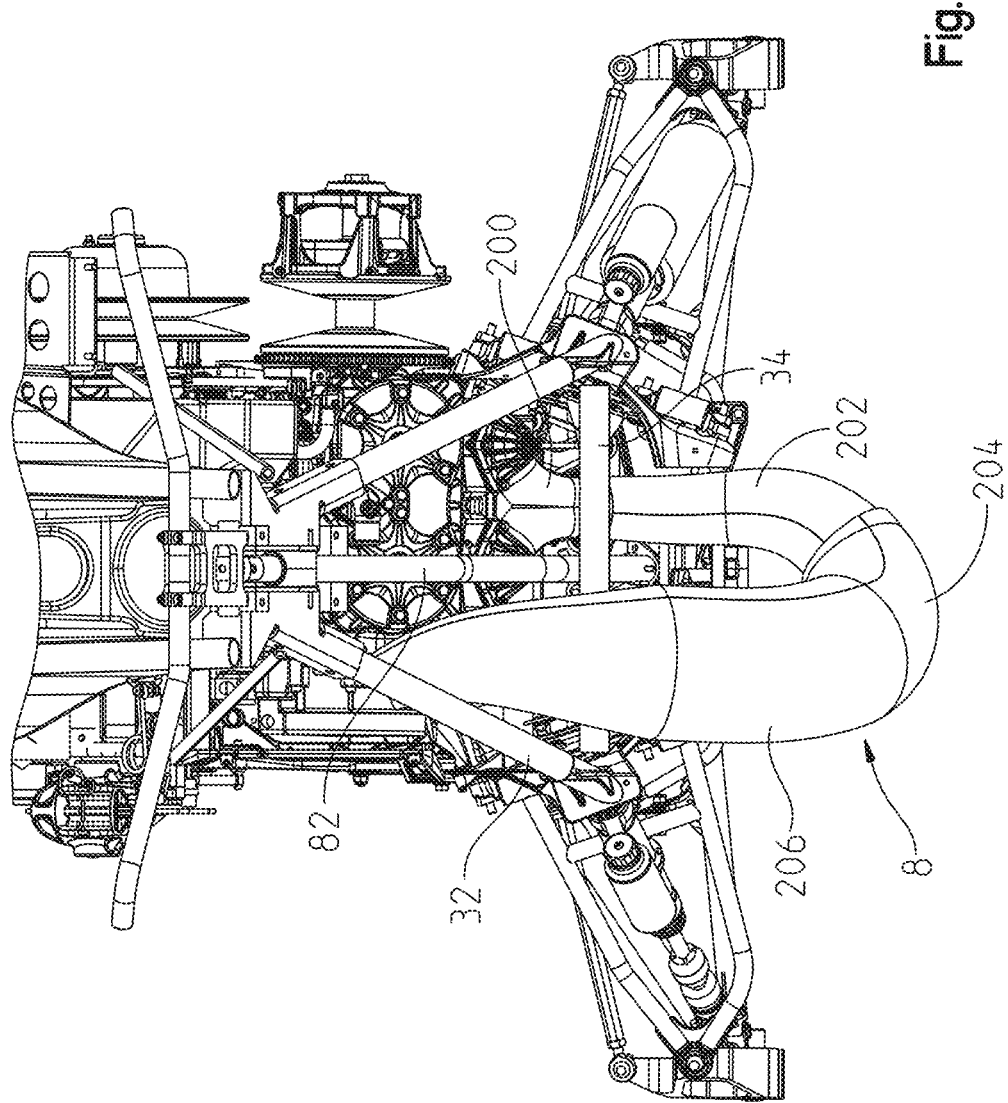
FIG. 8 is a top view of the embodiment shown in FIG. 7.
Figure 9:
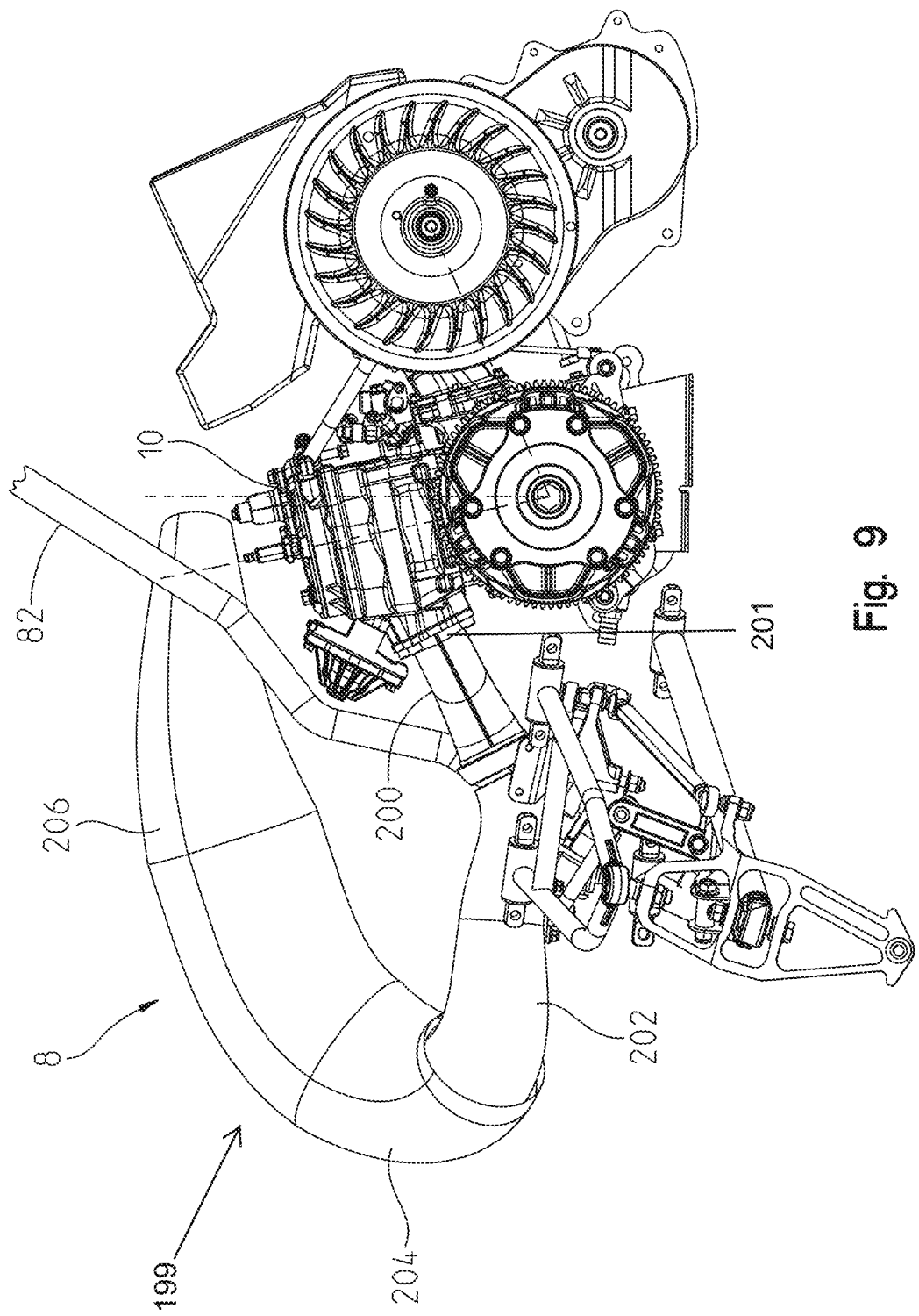
FIG. 9 is a side view of the embodiment in FIG. 8.
Figure 10:
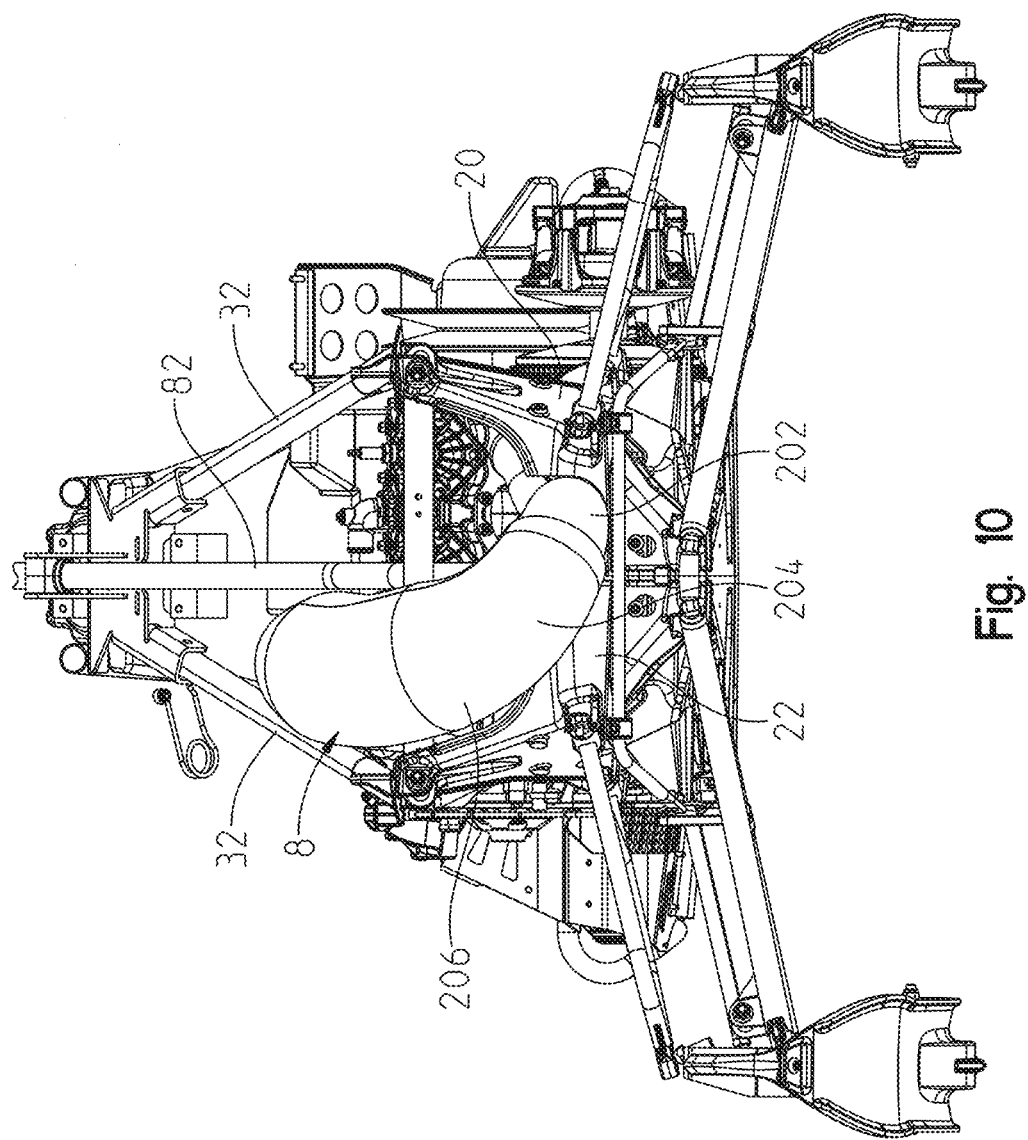
FIG. 10 is an enlarged front view of the snowmobile of FIG. 7.

With respect now to FIGS. 7-10, the exhaust system 8 will be described in greater detail. As shown, exhaust system 8 includes an exhaust manifold 200 extending forwardly and downwardly from engine 10, as best shown in FIGS. 8 and 9. Exhaust system 8 includes a first tube portion 202 extending generally longitudinally and forwardly past cast members 20, 22 and extending under cross tube 34 (FIGS. 7 and 8). As shown in FIG. 8, tube portion 202 extends on the vehicle left hand side of steering post 82. Exhaust system 8 further includes a vertically projecting radiused section 204 which turns the exhaust system 8 vertically upwardly and includes a reversely bent tube section 206 (FIG. 8) which extends generally longitudinally and rearwardly and extends on the opposite and vehicle right hand side of steering post 82. Tube portion 206 also extends above cross tube 34 and on the inside of frame tube 32. Thus the exhaust system 8 at the front of the snowmobile 2 is defined between the envelope of frame tubes 32 on either side.

Figure 11:
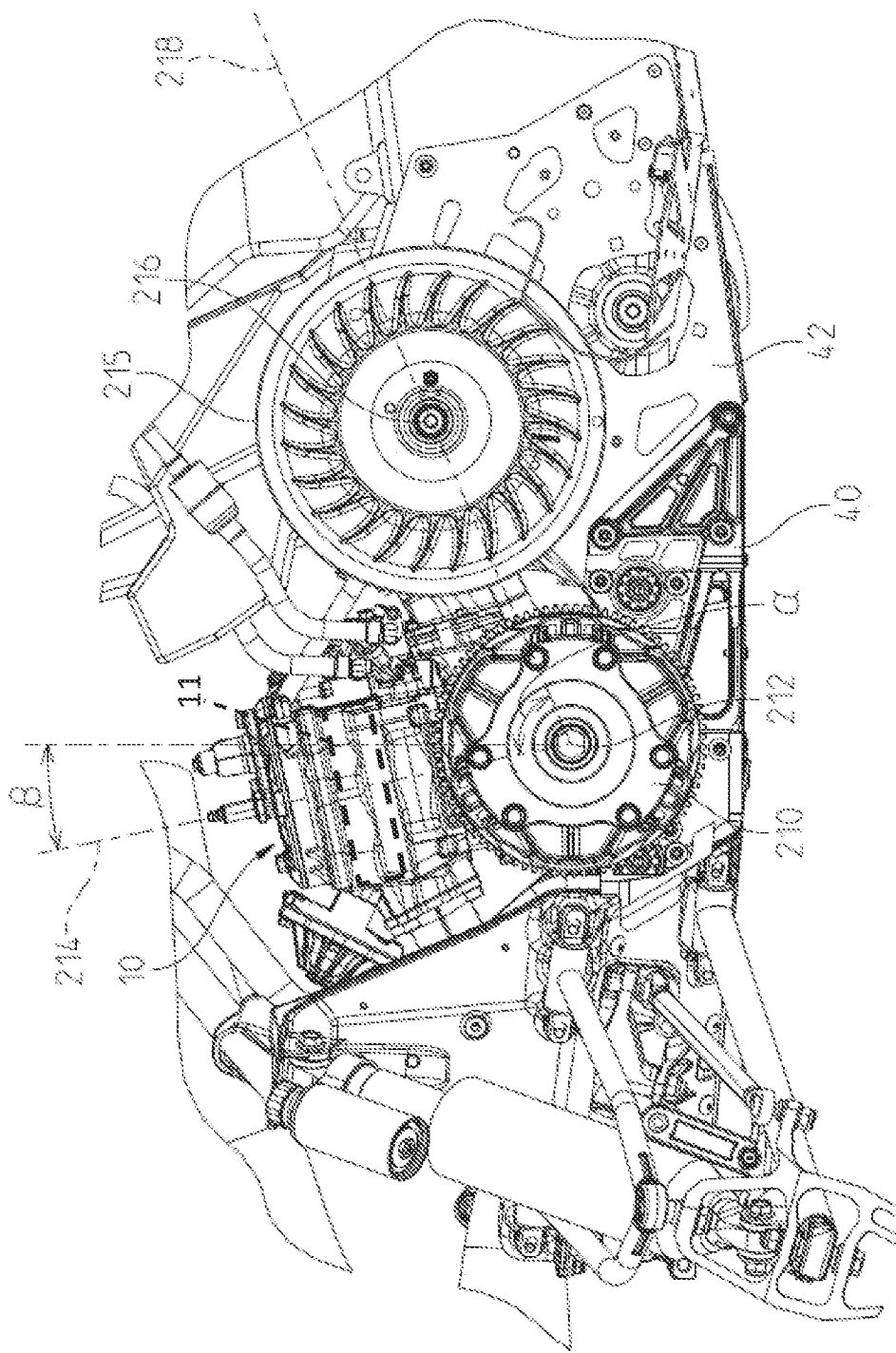
FIG. 11 is a side view of the engine and CVT configuration.

With respect now to FIG. 11, engine 10 is shown mounted in engine cradle 40 and tipped forward. As shown, a CVT (continuous variable transmission) drive clutch 210 is mounted coaxially with a crank shaft rotational axis 212. As shown, axis 212 is transverse to a longitudinal direction of snowmobile 2. As shown, engine 10 is a reciprocating type engine having a piston 11 reciprocating within an engine head of engine 10. Engine 10 includes a piston reciprocation axis 214 where axis 214 is rotated forward relative to vertical by an angle β. As shown, β equals 12°. As also shown, a CVT driven clutch 215 is mounted to drive housing 42 along a rotational axis 216. As is known in the art, a CVT belt (not shown) would entrain the drive clutch 210 and the driven clutch 215 to transmit power between the engine 10 and the driven clutch 215. A line drawn between axis 212 and axis 216 is known as the belt center axis, and is shown at 218. As an angle α is defined between lines 214 and 218 where a is in the range of approximately 70-100°. As shown, a equals 78°. This prevents any reciprocation vibration from being transmitted to the driven clutch 215.

Figure 12:
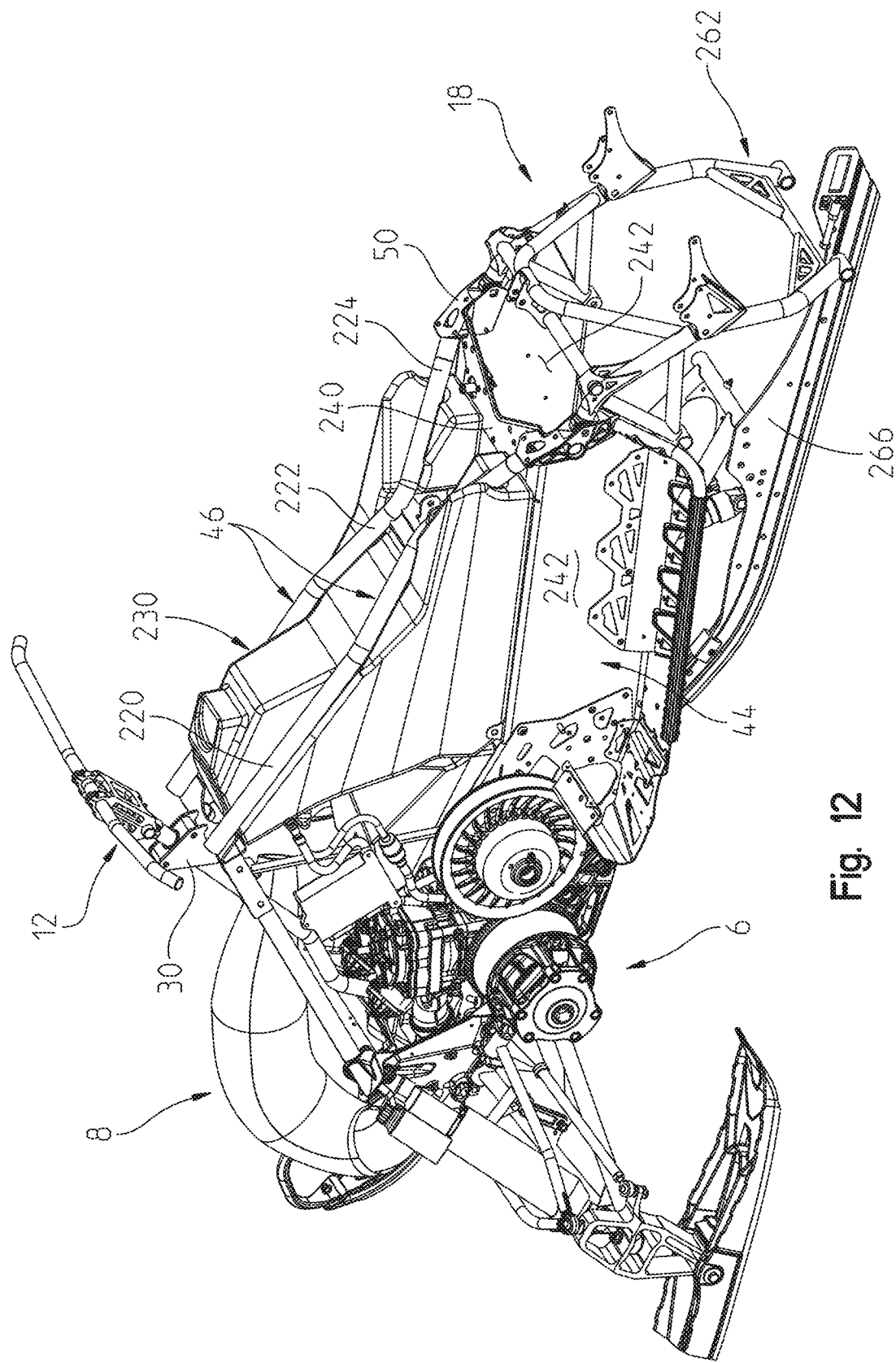
FIG. 12 shows a rear perspective view of the snowmobile of FIG. 1.
Figure 13:
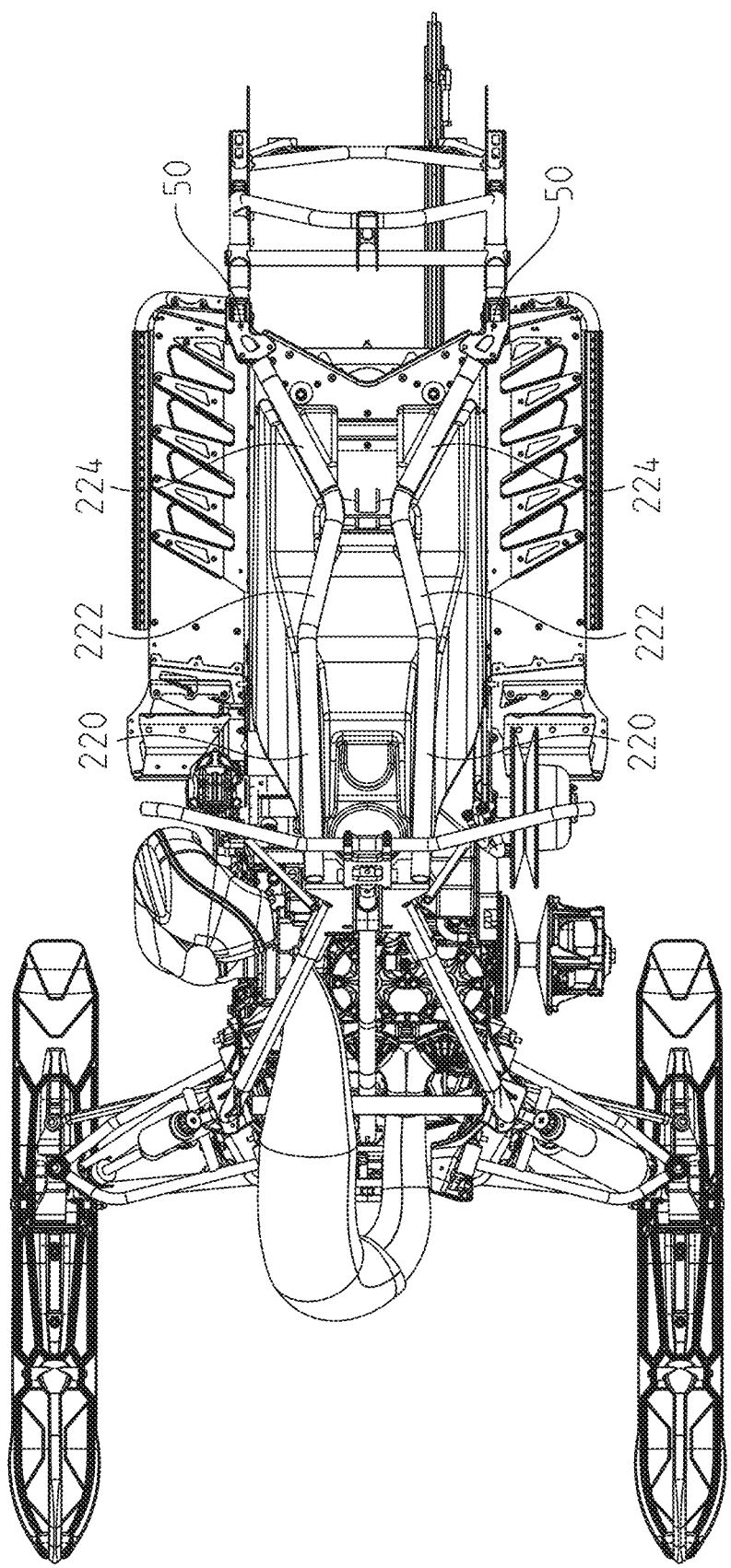
FIG. 13 shows a top view of the snowmobile of FIG. 12.
Figure 14:
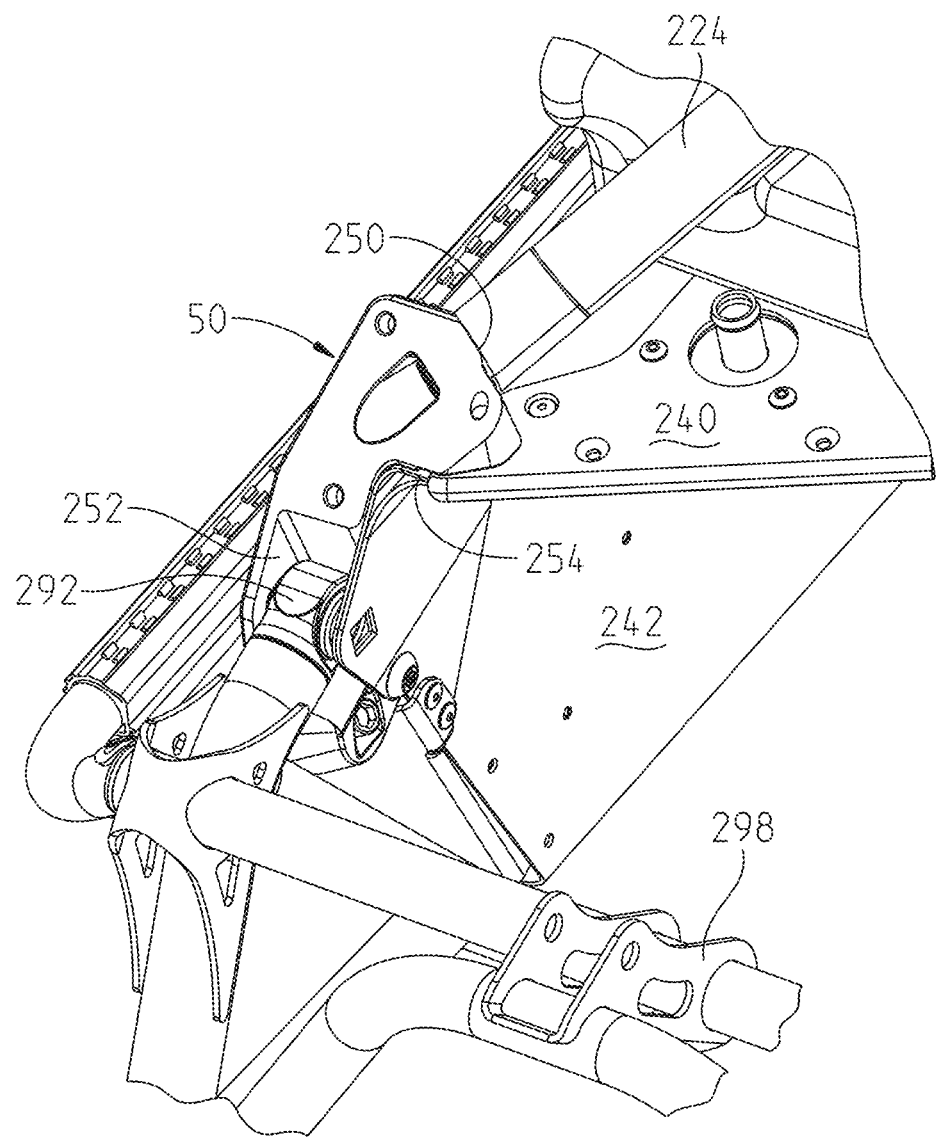
FIG. 14 shows an enlarged view of the tunnel couplings.

With reference now to FIGS. 12-14, the frame 4 will be further described. Frame tubes 46 include longitudinally extending sections 220, inwardly directed sections 222 and outwardly directed sections 224. Frame tubes 46 flank fuel tank 230 as described further herein. As also shown, tunnel 44 includes a top wall 240 and side walls 242 defining an internal enclosure for receiving the snowmobile track as is known in the art. Couplings 50 are mounted at the rear corners of tunnel 44 at the juncture of the top wall 240 and side walls 242. As shown best in FIG. 14, couplings 50 include apertures 250 receiving frame tube portions 224, a trunnion portion 252, and a mounting portion 254.

With reference now to FIGS. 15-19, rear suspension 18 will be described in greater detail. It should be appreciated that rear suspension 18 is similar to that described in U.S. patent application Ser. Nos. 11/623,879 and 12/627,642, the subject matter of which are incorporated herein by reference.

As shown, rear suspension 18 includes a front control arm 260, rear control arm 262, toggle link 264 and a pair (only one of which is shown) of slide rails 266. As shown best in FIGS. 17 and 18, front control arm 260 includes upper couplers 270 coupled to an inner surface of tunnel sidewall 242, arm portions 272 and a coupling tube 274. Coupling tube 274 is interconnected to inside surfaces of slide rail 266 as shown best in FIG. 15.

Figure 15:
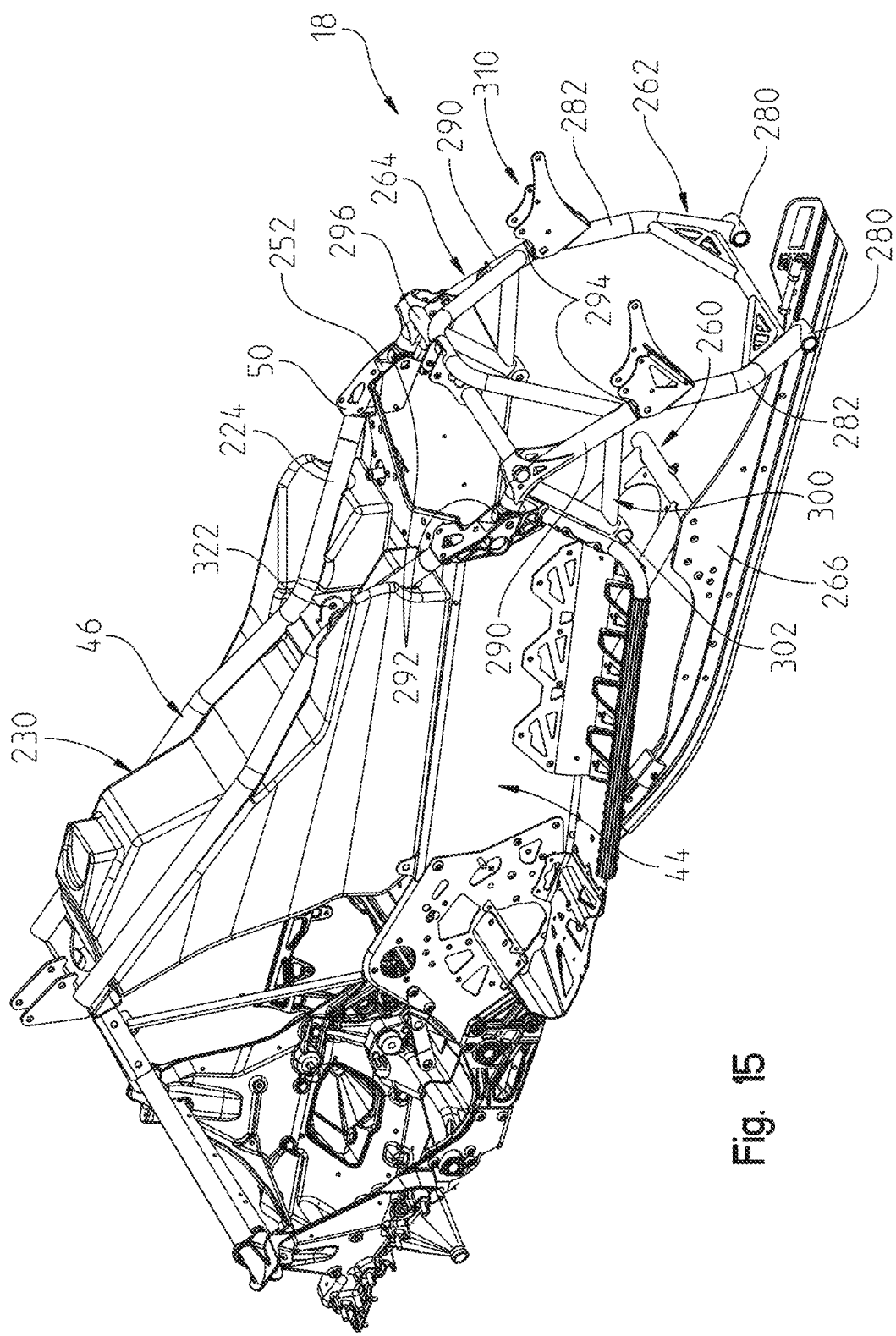
FIG. 15 shows a view similar to that of FIG. 12 less the drive mechanism.
Figure 16:
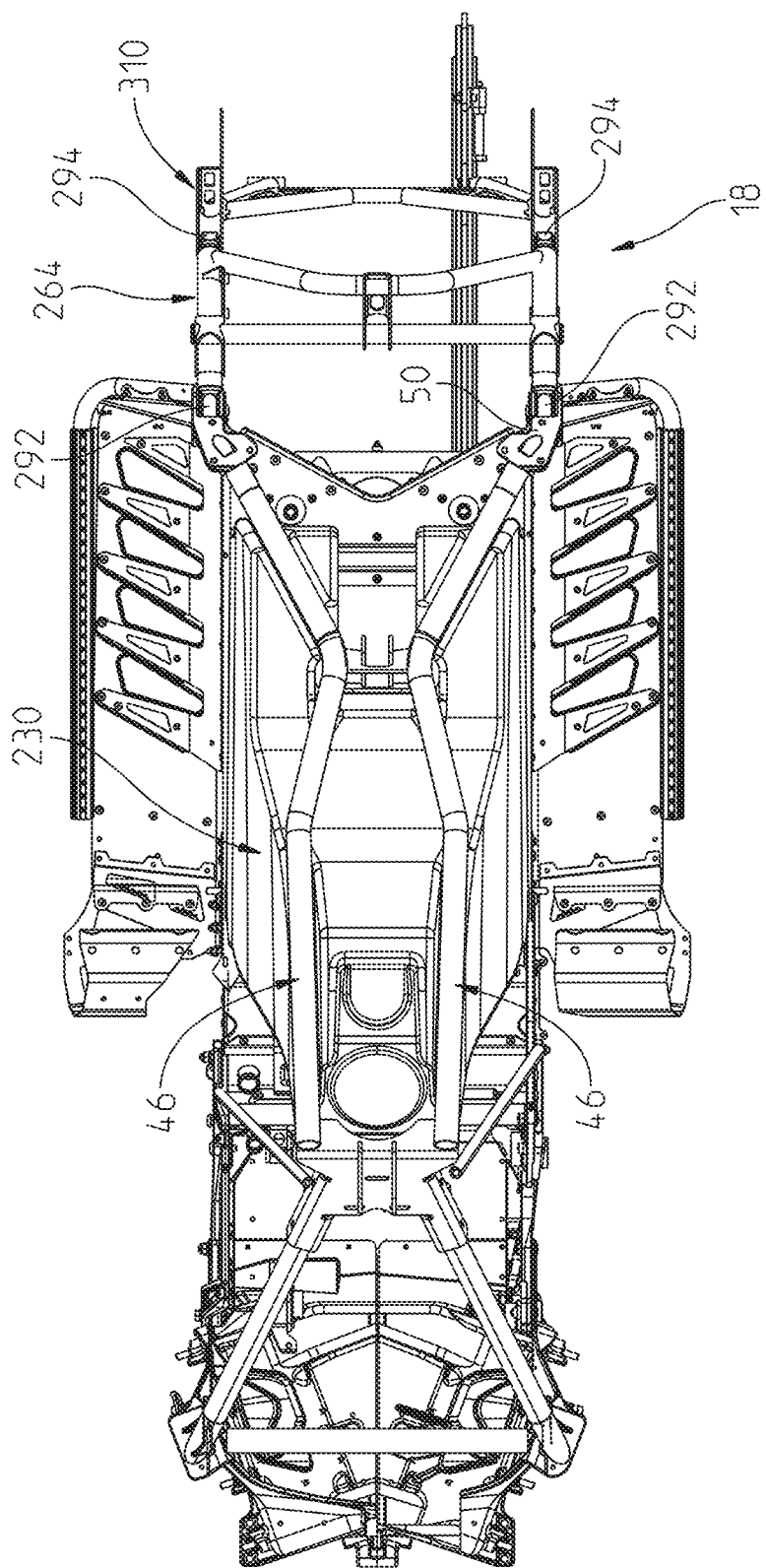
FIG. 16 shows a top view of the snowmobile frame of FIG. 15.
Figure 17:
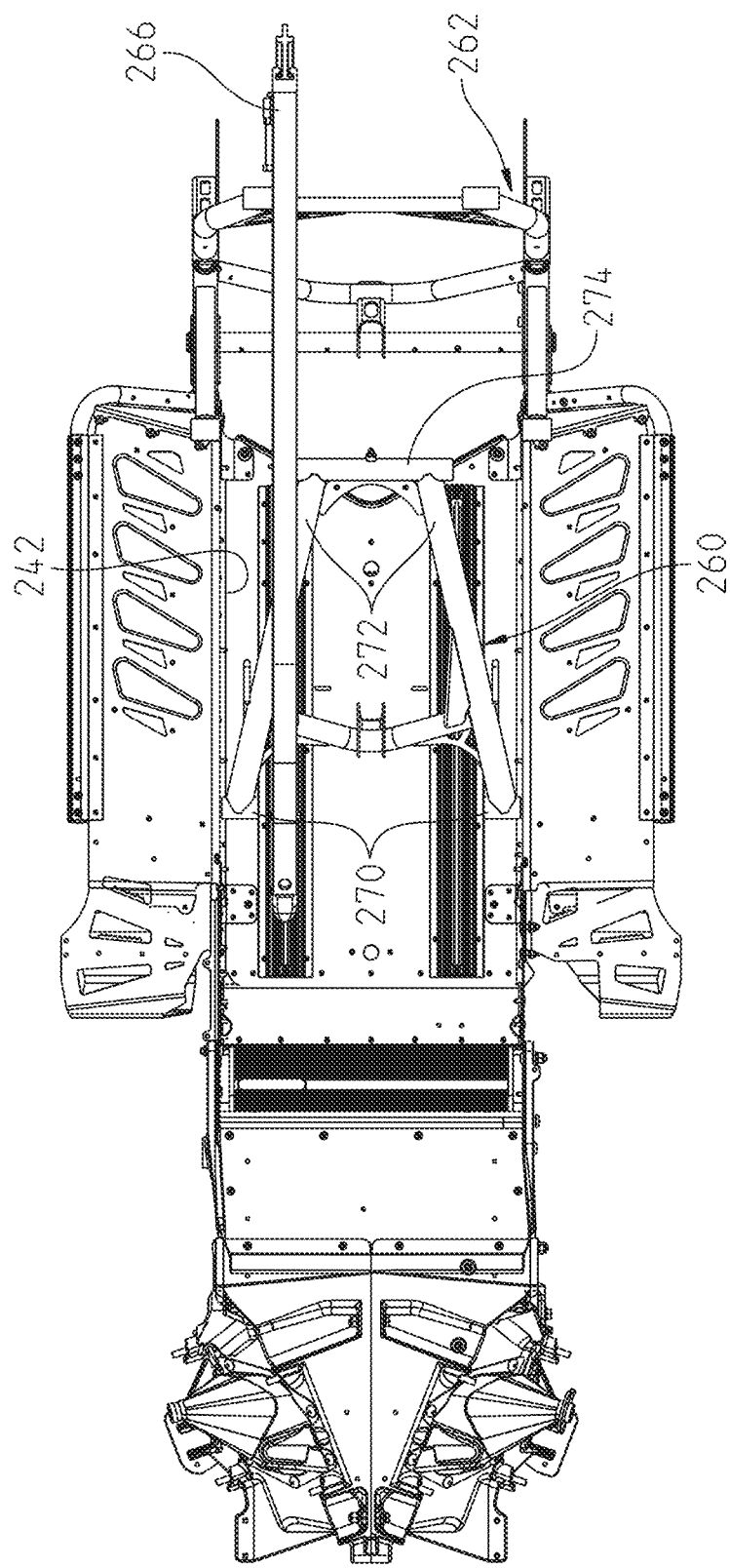
FIG. 17 shows a bottom view of the snowmobile of FIG. 16.
Figure 18:
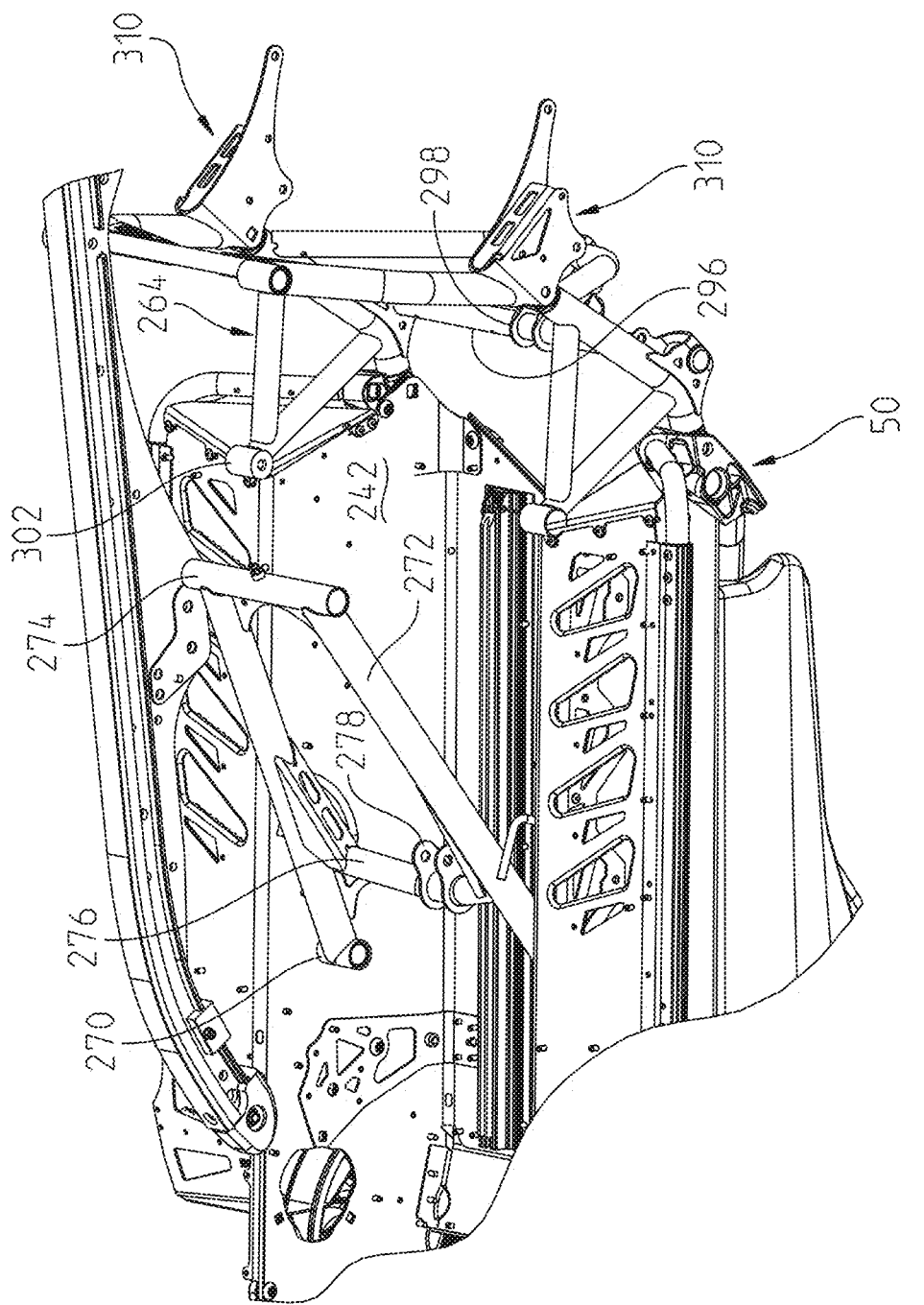
FIG. 18 shows an underside perspective view of the rear suspension.

As shown best in FIG. 15, rear control arm 262 includes couplers 280 coupled to slide rail 266 and arms 282 coupled to toggle link 264. Toggle link 264 is generally comprised of arms 290 including front couplers 292 pivotally mounted within trunnion portions 252 of couplers 50. Toggle link 264 further includes rear coupling portions 294 which couple to an upper portion of arms 282. A cross bar 296 locates a shock mount 298 (FIG. 19) as described herein. Arms 290 include triangular link portions 300 including couplers 302 for carrying a carrier roller (not shown) which is similar in design to that shown in U.S. patent application Ser. No. 12/627,642, the subject matter of which is incorporated herein by reference. Brackets 310 (FIG. 18) may also be provided to hold a rear heat exchanger as shown in U.S. patent application Ser. No. 13/018,824, the subject matter of which is incorporated herein by reference.

Figure 19:
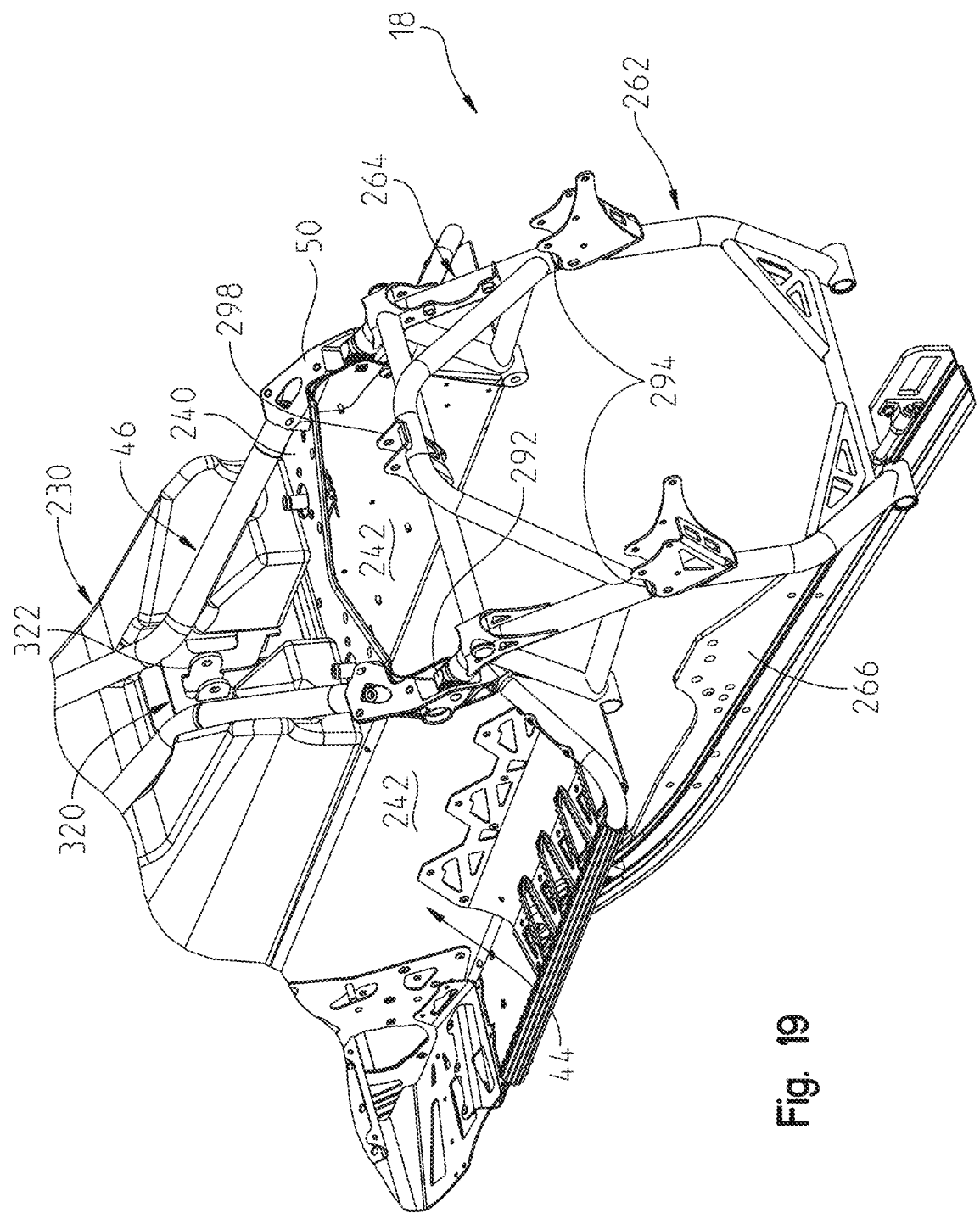
FIG. 19 shows a rear perspective view of the rear suspension.

Finally, a bracket 320 (FIG. 19) is attached to top surface 240 of tunnel 44 where a shock absorber is mounted between shock mounts 298 and 322. Thus with reference to FIG. 15, slide rails 266 move upwardly and downwardly relative to tunnel 44 by way of rear suspension 18. More particularly, as slide rail 266 moves relative to tunnel 44 (or tunnel 44 moves relative to slide rail 266), slide rails 266 move by way of front control arms 260 which are interconnected between tunnel 44 and slide rails 266. Moreover, as slide rails 266 move relative to tunnel 44, toggle link 264 is moved about couplings 292 towards and away from tunnel 44 under compression from a shock absorber mounted between shock mounts 298 and 322 (FIG. 19).

Figure 20:
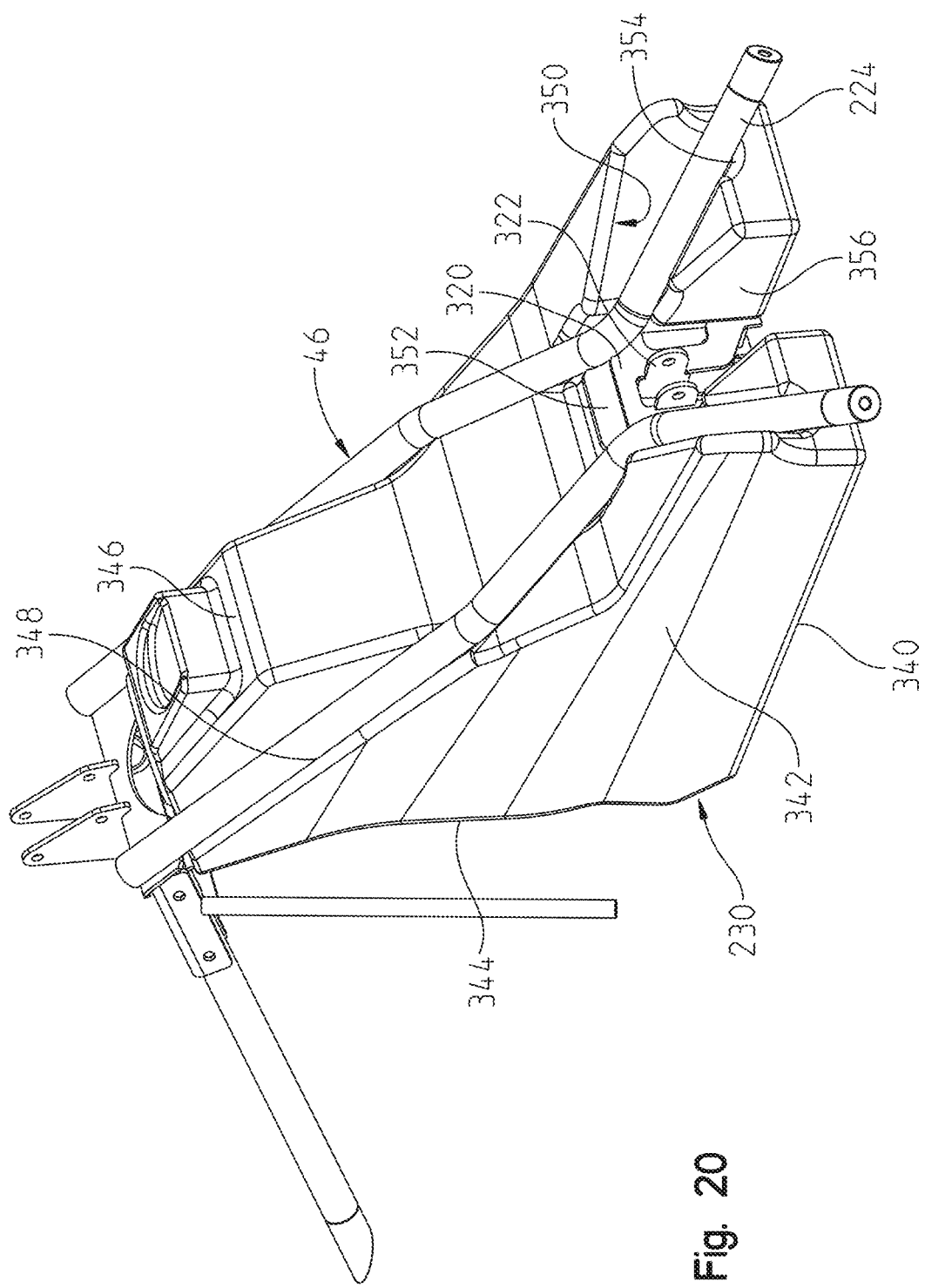
FIG. 20 shows a rear perspective view of the snowmobile fuel tank.

With reference now to FIG. 20, fuel tank 230 is shown in great detail. Fuel tank 230 is shown having a base portion 340 which conforms to the top surface 240 of tunnel 44, side walls 342, front wall 344, and a center narrow portion 346 defining shoulders 348 for receiving frame tubes 46. Fuel tank 230 further includes a rear opening 350 including a rear wall 352 to receive shock mounting bracket 320, shoulders 354 for receiving tube portions 224 and a rear opening 356 to receive shock absorber connected to shock mount 322.

With the rear suspension 18 described as mentioned above, the position of the operator and the operation of rear suspension 18 will now be described. With reference to FIG. 1, front ski 14 is attached to spindle 68 at position 400 which extends along a transverse axis 402. The present embodiment differs from the embodiments shown in U.S. patent application Ser. Nos. 11/623,879 and 12/627,642. First, the embodiment differs in that the operator has been positioned closer to the vehicle center of gravity from the previous embodiment, such that the rider is positioned substantially at the vehicle center of gravity, including the fuel and driver ($CG_{f-d}$). It should also be noted that the $CG_{f-d}$ may be changed plus or minus 2 inches based on the rider and the respective position on the snowmobile 2. Secondly, the front control arm 260 of the rear suspension assembly 18 has been moved rearwardly, which has modified the pitch of the vehicle. Finally, the tunnel 44 of the present embodiment has been elongated, which has provided several inherent improvements.

With reference to FIG. 3, a longitudinal position from ski bolt position 400 to a position of operator's hands on hand grip 404 is shown at $X_1$, where $X_1$ is in a range of 750-770 mm, and in the embodiment shown $X_1$ equals 29.93 inches (760.24 mm). This is approximately 2.5-4.0 inches forward of the position of the embodiments shown in U.S. patent application Ser. Nos. 11/623,879 and 12/627,642. In a similar manner, the position of the operator's hands on hand grip 404 is forward of a belt drive axis 406 by a distance of $X_2$, where $X_2$ is in a range of 100-120 mm, and in the embodiment shown $X_2$ equals 4.385 inches (111.39 mm). Snowmobile 2 also includes an operator's foot rest 408, and a forward most position of foot rest 408 is forward of drive axis 406 by a dimension of $X_3$, where $X_3$ is in a range of 30-50 mm, and in the embodiment shown $X_3$ equals 1.54 inches (39.1 mm). As also shown in FIG. 3, the center of gravity of the vehicle dry with the suspension in the fully extended position ($CG_d$) is shown at 410 which is rearward of drive axis 406 by a dimension of $X_4$, where $X_4$ is in a range of 65-75 mm, and in the embodiment shown equals 2.699 inches (68.57 mm).

Position 412 in FIG. 3 represents the pivot axis of front control arm 260 and in particular the position for connection of couplings 270 (FIG. 17) inside the tunnel 44. This is approximately 5.5 inches rearward of the position shown in the embodiments shown in U.S. patent application Ser. Nos.

11/623,879 and 12/627,642. The longitudinal distance for pivot point 412 is positioned a distance of $X_5$ from drive axis 406, where $X_5$ is in a range of 210-260 mm, and in the embodiment shown equals 236.33 mm. Position 414 shows a seating position for operator on snowmobile 2. The seating position is rearward of drive axis 406 by a dimension of $X_6$, where $X_6$ is in a range of 405-505 mm, and in the embodiment shown equals 18.00 inches (457.20 mm). Thus the positions 404, 408 and 414 define the operator coordinates relative to the $CG_d$. Furthermore, the pivot point 360 for toggle link 264 (FIG. 15) is at the center of coupler 292. The distance between the drive axis 406 and pivot point 360 is $X_7$, where $X_7$ is in a range of 700-800 mm, and in the embodiment shown equals 29.766 inches (756.055 mm). As also shown in FIG. 3, a distance from the ski bolt position 400 and spindle pivot axis 402 to the front control arm mounting 412 is in the range of 1000-1200, and is approximately 1100 mm. In the embodiment distance from the ski bolt position 400 to the front control arm mounting 412 is 1107.96 mm ($X_1+X_2+X_5$).

As also shown in FIG. 3, the vertical position of pivot point 412 is $Y_1$ from a ground position and the vertical position of $CG_d$ 410 is in a range of 320-360 mm, and in the embodiment shown is equal to 345.10 mm or an incremental $Y_2$, where $Y_2$ equals 92.22 mm.

In this position, the pivot point 412 of front control arm 260 is rearward of the $CG_d$, whereas in the version shown in U.S. patent application Ser. Nos. 11/623,879 and 12/627,642, the pivot point of front control arm 260 is forward of the $CG_d$. Thus, the positioning of the front control arm 260, and particularly the mounting of couplers 270, can vary the amount of the vehicle pitch. The steeper the angle of control arm 260, the greater the vehicle pitches; whereas the flatter the angle of control arm 260, the lesser the vehicle pitches. This is due to the vertical force component of front control arm 260 acting on and through the coupler 270.

With reference still to FIG. 3, the pivot point for toggle link 264 is at coupler 292, which is 54.6 mm further back from the position shown in U.S. patent application Ser. Nos. 11/623,879 and 12/627,642. This improves carrier wheel engagement, improves transfer control, reduces sensitivity, increases running-board length, provides room for fuel capacity and provides a more rearward position for the shock mounting.

Figure 21:
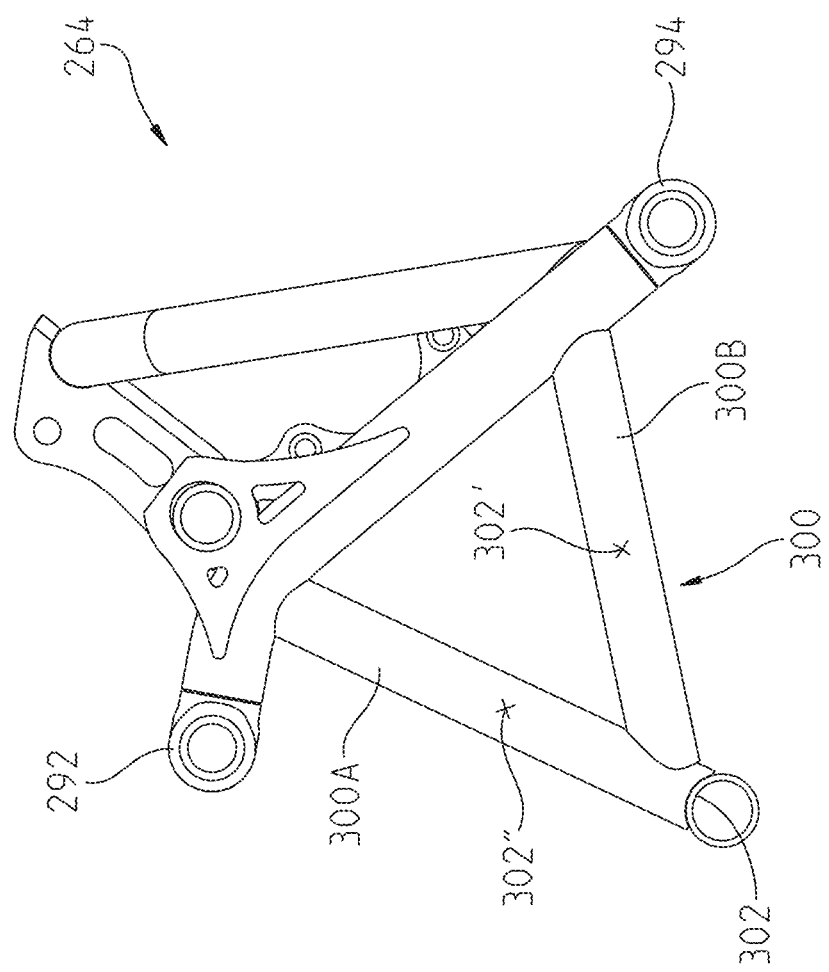
FIG. 21 shows a side view of the toggle link.

With reference now to FIG. 21, toggle link 264 is shown in side view. As mentioned above, toggle link 264 rotates relative to tunnel 44 via pivot couplings 292 and rotates relative to rear control arm 262 by way of pivot coupling 294. As shown in the FIG. 21 embodiment, legs 300A, 300B, which make up link 300, are substantially the same length. A carrier roller (not shown) is rotatably mounted to coupling 302. As toggle link 264 is rotatably coupled to tunnel 44 at pivot point 292, during compression of rear suspension 18, toggle link 264 rotates counterclockwise. As toggle link 264 rotates, a carrier roller attached at 302 has some slight vertical downward movement before it swings vertically upward. However, the carrier roller may be moved to other positions relative to the toggle link 264 to change the position of the carrier roller, and resultantly, can the dynamic attributes of the snowmobile 2, as discussed below.

For example, and with reference to FIG. 21, a carrier roller mounted further rearward along arm 300B (for example to a point 302'), would have immediately upward movement upon counter clockwise rotation of toggle link 264 and would provide more aggressive propulsion of the drive belt. This is due to the increase in bias of the carrier roller, which upon acceleration of snowmobile 2, causes more load to go down to the rear control arm 262, then to the slide rail 266 and into the ground. Conversely, if a carrier roller were moved upward to a position 302" along arm 300A, upon acceleration, the chassis is pulled down resulting in more vertical lift of the snowmobile during acceleration. It should also be noted that movement rearward, for example to position 302' also increases the cornering ability of the snowmobile 2.

Figure 22:
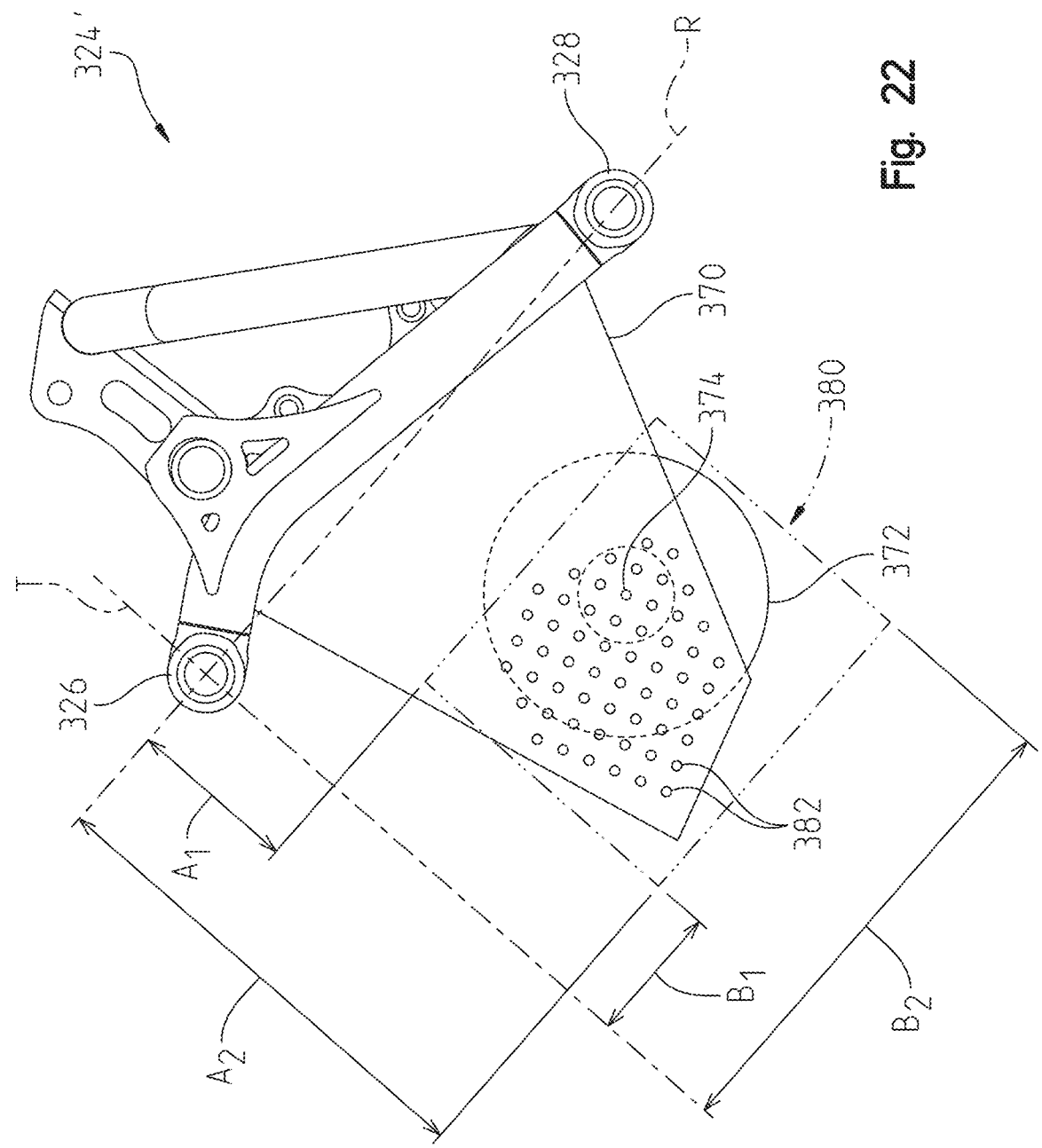
FIG. 22 shows an alternative embodiment of the toggle link.

Thus, and with reference to FIG. 22, a toggle link 324' could be provided having front and rear pivot points 326 and 328. Arms 300A and 300B of the FIG. 21 embodiment are replaced by a trapezoidal plate 370 with a roller 372 mounted thereto. Roller 372 is mounted about a center of rotation 374. Carrier roller 372 could be positioned within a zone defined within hypothetical box 380 where the desirability of the drive characteristics could be "tuned" by positioned roller on any one of the mounting apertures 382. Hypothetical box 380 is defined relative to a reference line R drawn through the centers of pivot points 326 and 328, and relative to a tangent line T, tangent to reference line R and through pivot point 326. With reference to FIG. 22, hypothetical box 340 is approximately positioned between $A_1$ (80 mm) and $A_2$ (225 mm) from reference line R, and $B_1$ (60 mm) and $B_2$ (225 mm) from reference line T. In the embodiment shown, hypothetical box 340 is positioned between $A_1$ (80 mm) and $A_2$ (226.68 mm) from reference line R, and $B_1$ (59.35 mm) and $B_2$ (225.23 mm).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed:

1. A snowmobile, comprising:
   a chassis comprising a front chassis portion and a rear chassis portion, the front chassis portion including a bulkhead, the bulkhead comprising a plurality of frame members including at least one frame member;
   an engine supported by the chassis, the engine comprising an exhaust system;
   a steering post extending substantially along a longitudinal centerline of the snowmobile, the steering post extending over a top of the engine and coupled to the bulkhead;
   a pair of front steerable skis comprising a first steerable ski and a second steerable ski;
   a pair of spindles coupled to the skis comprising a first spindle coupled to the first steerable ski and a second spindle coupled to the second steerable ski;
   a first steering arm coupled to the first spindle; and
   a first coupling link interconnecting the first steering arm and the steering post and including a plurality of radially extending surfaces, the first coupling link being an extruded member forming plural pivot points.

2. The snowmobile of claim 1, further comprising a second coupling link and a second steering arm coupled to the second spindle, and the second coupling link being operably coupled between the second steering arm and the steering post, the second coupling link being an extruded member forming plural pivot points.

3. The snowmobile of claim 2, further comprising a drag link coupled between the first and second coupling links.

4. The snowmobile of claim 3, wherein the first coupling link has four pivot points, a first pivot point to pivotally couple the first coupling link to the chassis, a second pivot point to pivotally couple the first coupling link to the steering post, a third pivot point to pivotally couple the first coupling link to the drag link and a fourth pivot point to pivotally couple the first coupling link to the first steering arm.

5. The snowmobile of claim 3, wherein the engine has at least one intake and the exhaust system comprises at least one exhaust port, the at least one exhaust port faces forwardly and a portion of an exhaust manifold extends forwardly from the at least one exhaust port at a position vertically higher than the first coupling link.

6. The snowmobile of claim 5, wherein a tube portion is coupled to the at least one exhaust port, the tube portion projecting vertically upwardly to a position higher than the engine and projecting rearwardly between the steering post and the at least one frame member.

7. The snowmobile of claim 3, further comprising a steering mount positioned above the bulkhead by way of the at least one frame member of the plurality of frame members, the steering mount positioned rearward of the drag link.

8. The snowmobile of claim 7, wherein the exhaust system comprises at least one exhaust port and a tube portion coupled to the at least one exhaust port, and the at least one exhaust port is on one lateral side of the steering post and a rearwardly projecting portion of the tube portion is on the opposite lateral side of the steering post.

9. The snowmobile of claim 7, wherein the bulkhead comprises a cast portion, and a suspension arm is coupled between the cast portion and the first spindle, and wherein the steering mount is provided on a frame coupler and the plurality of frame members includes a plurality of frame tubes, and at least one frame tube of the plurality of frame tubes being coupled to the coupler and to the cast portion.

10. The snowmobile of claim 9, wherein at least a portion of the plurality of frame tubes define an inverted V-shape extending downwardly from the coupler.

11. The snowmobile of claim 1, wherein the bulkhead is defined by cast portions connected along a center seam.

12. The snowmobile of claim 11, further comprising at least one suspension assembly having an inner end mounted to the cast portions and an outer end mounted to the skis.

13. The snowmobile of claim 11, further comprising a cross support tube extending transversely between the cast portions.

14. The snowmobile of claim 13, wherein the exhaust system comprises a tube portion with a rearwardly projecting portion extending over a top of the cross support tube.

15. The snowmobile of claim 1, further comprising a first drag link coupled between the first coupling link and the steering post.

16. The snowmobile of claim 1, wherein the first coupling link includes a plurality of links coupling the plural pivot points.

17. A snowmobile, comprising:
a chassis comprising a front chassis portion and a rear chassis portion, the front chassis portion including a bulkhead, the bulkhead comprising at least one frame member;
an engine supported by the chassis, the engine comprising an exhaust system;
a steering post extending substantially along a longitudinal centerline of the snowmobile, the steering post extending over a top of the engine and coupled to the bulkhead;
a pair of front steerable skis comprising a first steerable ski and a second steerable ski;
a pair of spindles coupled to the skis comprising a first spindle coupled to the first steerable ski and a second spindle coupled to the second steerable ski;
a first steering arm coupled to the first spindle;
a first coupling link interconnecting the first steering arm and the steering post; and
wherein the first coupling link is an extruded member forming plural pivot points, and the first coupling link is coupled to the chassis independent of the steering post and spaced apart from the steering post, and the plural pivot points include a first portion of pivot points and a second portion of pivot points, and the first portion of pivot points are coupled between the steering post and the pair of front steerable skis and the second portion of pivot points are coupled to the chassis.

18. The snowmobile of claim 17, wherein the first coupling link is coupled to the chassis through a bracket independent of the steering post.

19. The snowmobile of claim 17, wherein the plural pivot points include a first pivot point coupled to the steering post, a second pivot point coupled to the first steering arm, a third pivot point coupled to a second steering arm coupled to the second spindle, and a fourth pivot point coupled to the chassis.

* * * * *